US008385046B2

(12) United States Patent
Palusinski et al.

(10) Patent No.: US 8,385,046 B2
(45) Date of Patent: Feb. 26, 2013

(54) NANO SCALE DIGITATED CAPACITOR

(75) Inventors: Olgierd A. Palusinski, Tucson, AZ (US); Grzegorz S. Zareba, Tucson, AZ (US); Kenneth L. Bartley, Woodbridge, VA (US); Jaeheon Lee, Highlands Ranch, CO (US); Zuzanna S. Siwy, Irvine, CA (US)

(73) Assignees: The Arizona Board Regents, Tucson, AZ (US); The Regents of the University of California, Oakland, CA (US)

( * ) Notice: Subject to any disclaimer, the term of this patent is extended or adjusted under 35 U.S.C. 154(b) by 647 days.

(21) Appl. No.: 11/934,031

(22) Filed: Nov. 1, 2007

(65) Prior Publication Data

US 2008/0180883 A1 Jul. 31, 2008

Related U.S. Application Data

(60) Provisional application No. 60/859,758, filed on Nov. 17, 2006, provisional application No. 60/855,884, filed on Nov. 1, 2006.

(51) Int. Cl.
*H01G 4/005* (2006.01)
*H01G 4/06* (2006.01)
(52) U.S. Cl. ........................................ 361/303; 361/311
(58) Field of Classification Search .......... 361/303–305, 361/311
See application file for complete search history.

(56) References Cited

U.S. PATENT DOCUMENTS

| 3,914,666 A * | 10/1975 | Schmickl et al. ............. 361/329 |
| 5,656,834 A | 8/1997 | Grzyb et al. | |
| 6,496,053 B1 | 12/2002 | Daubenspeck et al. | |
| 6,798,641 B1 | 9/2004 | Hopper et al. | |
| 6,949,793 B2 * | 9/2005 | Choi et al. ..................... 257/316 |
| 6,952,055 B2 | 10/2005 | Scherer et al. | |
| 6,982,197 B2 | 1/2006 | Ku et al. | |
| 7,033,406 B2 | 4/2006 | Weir et al. | |
| 7,075,185 B2 | 7/2006 | Nelson et al. | |
| 7,084,002 B2 | 8/2006 | Kim et al. | |
| 7,143,389 B2 | 11/2006 | Wang et al. | |
| 2003/0161091 A1 * | 8/2003 | Devoe et al. ............... 361/321.2 |

FOREIGN PATENT DOCUMENTS

JP 03129914 A * 6/1991
JP 2003249417 A * 9/2003

OTHER PUBLICATIONS

N. S. Averkiev, et al.; "Capacitance properties of a system of coupled nanowires"; The American Physical Society; Physical Review B, vol. 59, No. 4, pp. 3250-3254; Jan. 15, 1999.
K. B.Shelimov, et al.; "Template-grown high-density nanocapacitor arrays"; American Institute of Physics; Applied Physics Letters, vol. 27 No. 11; pp. 1722-1724; Jul. 13, 2000.
Johan Klootwijk, et al., "Extremely High-Density Capacitors With ALD High-K Dielectric Layers", 2006, pp. 17-28.
H. Föll, et al., "Formation and application of porous silicon", Materials Science and Engineering, R 39, (2002), pp. 93-141.
F. Roozeboon, et al., "High-value MOS capacitor arrays in ultradeep trenches in silicon", Microelectronic Engineering, vol. 53, 2000, pp. 581 584.

(Continued)

*Primary Examiner* — Eric Thomas
(74) *Attorney, Agent, or Firm* — Oblon, Spivak, McClelland, Maier & Neustadt, L.L.P.

(57) ABSTRACT

A capacitor device having a first conductive element and a second conductive element. The capacitor includes a porous membrane disposed between the first and second conductive elements. The capacitor has pores included in the porous membrane extending from the first conductive element to the second conductive element, and a conductive material is disposed inside the pores and in contact with the first conductive element.

22 Claims, 28 Drawing Sheets

OTHER PUBLICATIONS

V. Lehmann et al., "The Physics of Macropore Formation in Low-Doped p-Type Silicon", Journal of the Electrochemical Society, vol. 146, No. 8, 1999, pp. 2968-2975.

Marianna Kemell, et al., "Si/Al$_2$O$_3$/ZnO:Al capacitor arrays formed in electrochemically etched porous Si by atomic layer deposition", Microelectronic Engineering, vol. 84, 2007, 313-318.

M. Christophersen et al., "Macropore Formation on Highly Doped n-Type Silicon", phys. stat. sol. (a) vol. 182, vol. 45, 2000, pp. 45-50.

Charles T. Black, et al, "High-Capacity, Self-Assembled Metal-Oxide-Semiconductor Decoupling Capacitors", IEEE Electron Device Letters, vol. 25, No. 9, Sep. 2004, pp. 622-624.

V. Lehmann, et al., "A novel capacitor technology based on porous silicon", Thin Solid Films, vol. 276, 1996, pp. 138-142.

Richard Ulrich, "Matching embedded capacitor dielectrics to applications", Circuit World, 30/1 [2003], pp. 20-24.

Jaeheon Lee, et al., "Electrodeposition in Nanostructure Templates using Novel Cathode Preparation", ECS Transactions, 1, (12), 2006, 25-31.

I. Enculescu, et al., "Copper nanowires electrodeposited in etched single-ion track templates", Applied Physics A—Materials Science & Processing, 77, 2003, pp. 751-755.

Z. Siwy, et al., "Fabrication of a Synthetic Nanopore Ion Pump", Physical Review Letters, vol. 89, No. 19, Nov. 4, 2002, pp. 198103-1 to 198103-4.

Zuzanna S. Siwy, "Ion-Current Rectification in Nanopores and Nanotubes with Broken Symmetry", Advanced Fuctional Materials, 16, 2006, pp. 735-746.

Jaeheon Lee, et al., "Electrical Characterization of Nano Structured Energy Storage Devices", ECS Transactions, 2 (8), 2007, pp. 121-127.

"Universal Bonding Structure for Electronic Chips and Packages", Office of Technology Transfer Invention or Copyrightable Work Disclosure Assigned in OTT Office, 8 pages.

"Electronic Packaging Problems of Flip Chip Solder Bonding High Processing Temp. for solder reflow 190-250 ° C.", Electronic Application, 2 pages.

Hideki Masuda, et al., "Highly order nanochannel-array architecture in anodic alumina", Appl. Phys. Lett., 71, (19), Nov. 10, 1997, pp. 2770-2772.

O. Jessensky, et al., "Self-organized formation of hexagonal pore arrays in anodic alumina", Applied Physics Letters, vol. 72, No. 10, Mar. 9, 1998, pp. 1173-1175.

J. Vetter, et al., "Application of ion track mebranes for preparation of metallic microstructures", Nuclears Intstruments and Methods in Physics Research B79, 1993, pp. 691-694.

Jaeheon Lee, et al., "Fabrication of Gold Nano-Wires via Electrodeposition in Templates", Nano-Technology Initiative-Department of ECE Interim Report-Aug. 25, 2004, pp. 1-8.

Jaeheon Lee, et al., "Gold Nano-Structure Built in Polycarbonate Templates", pp. 1-8.

* cited by examiner

BACKGROUND ART

Top section: 100 nm pores
Mid Section: 150 nm pores
Bottom Section: 200 nm pores

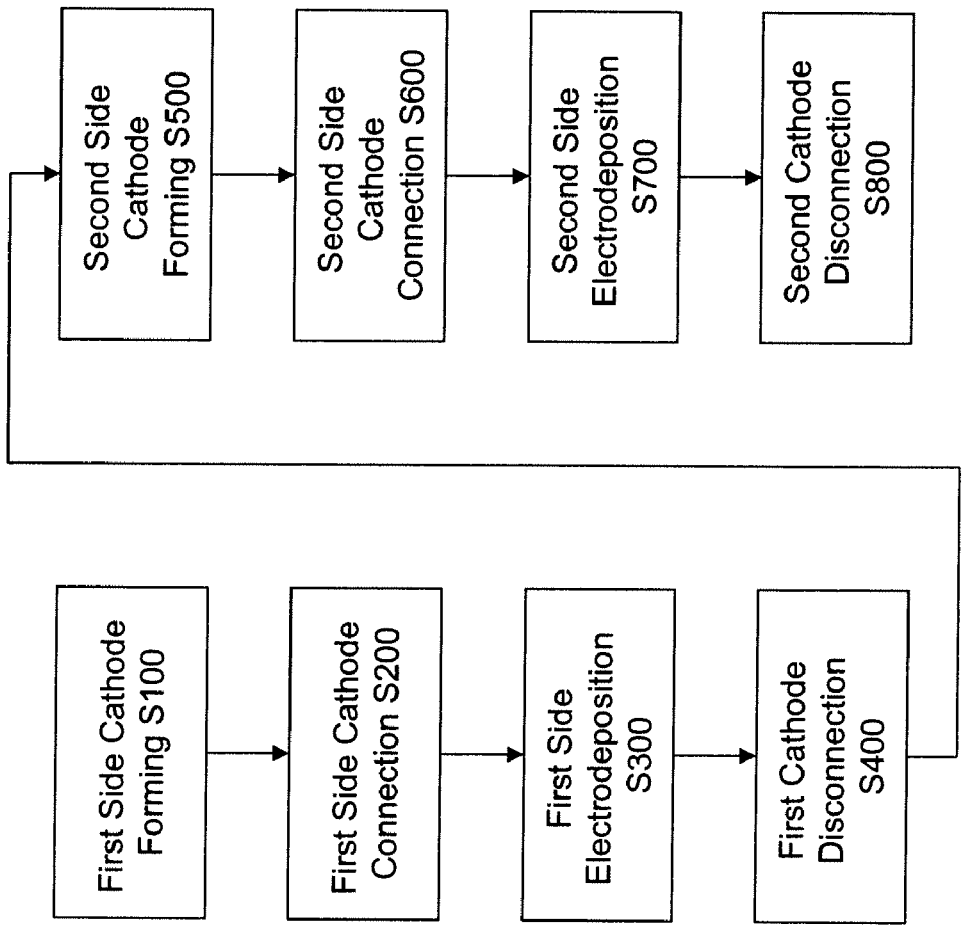

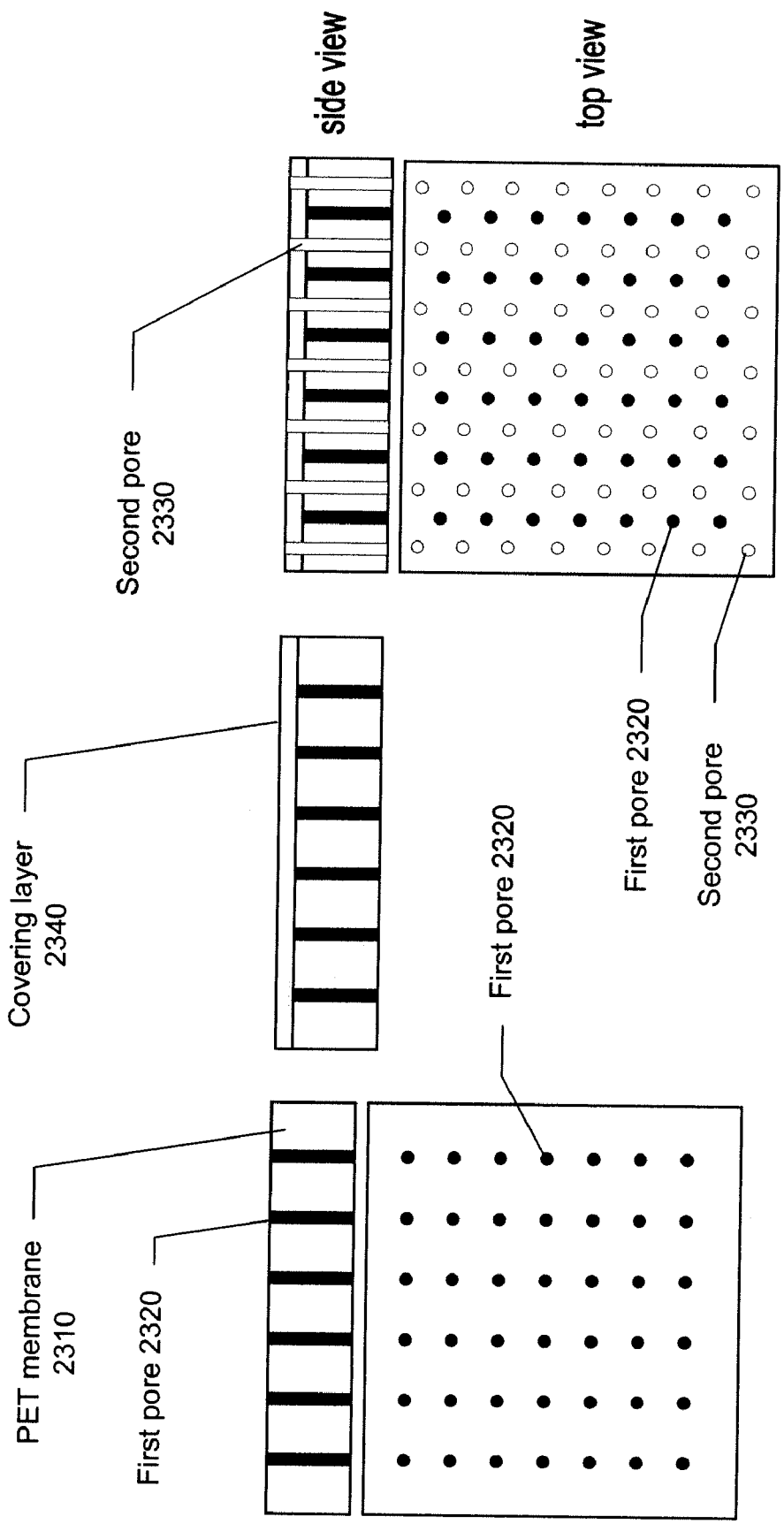

Fig. 23F
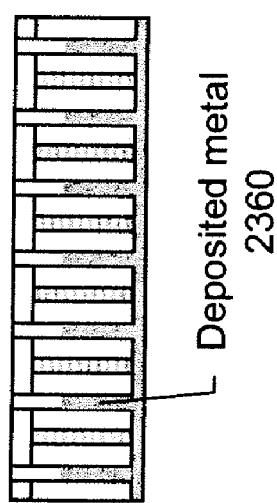
Fig. 23E
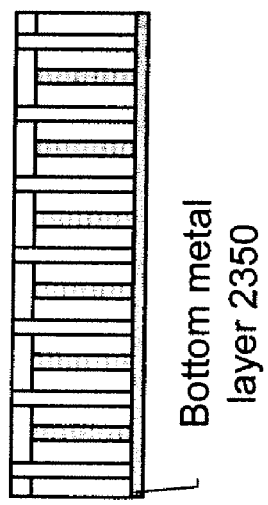
Fig. 23D
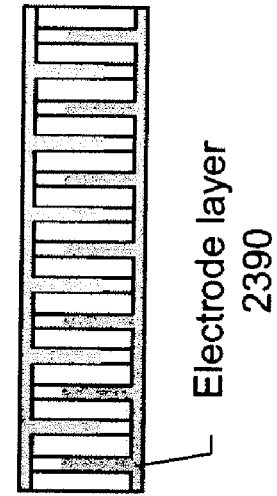
Fig. 23I
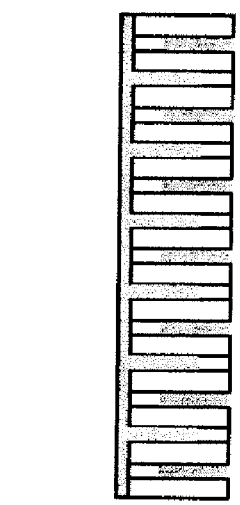
Fig. 23H
Fig. 23G

NANO SCALE DIGITATED CAPACITOR

CROSS REFERENCE TO RELATED APPLICATIONS

This application is related to and claims priority under 35 U.S.C. §119(e) to U.S. Ser. No. 60/855,884 entitled "ONE-MASK PROCESS FOR TWO-SIDED ELECTRODEPOSITION INTO TEMPLATED NANOSTRUCTURES FOR FABRICATING INTERDIGITATED ENERGY STORAGE DEVICES (IESD)" filed Nov. 1, 2006, the entire contents of which are incorporated herein by reference. This application is also related to and also claims priority under 35 U.S.C. §119(e) to U.S. Ser. No. 60/859,758 entitled "TECHNOLOGY FOR BUILDING CAPACITORS USING TEMPLATES WITH NANO SCALE PORES" filed Nov. 17, 2006, the entire contents of which are incorporated herein by reference.

BACKGROUND OF THE INVENTION

1. Field of the Invention

The present invention relates to nano-scale capacitors and methods for fabricating these capacitors.

2. Discussion of the Related Art

Capacitors are known in the art as devices including two conductors (with any geometry) insolated from each other so that the conductors can be given and typically hold equal, but opposite, charges. In an ideal capacitor, a positive charge (+q) that exists on one electrode is offset by a negative charge (−q) on the other electrode. The material that electrically isolates the electrodes from each other is an insulator with a specific dielectric value. The charge value at DC conditions can be determined from the following formula:

$$Q = C \times V \text{ (coulomb)}$$

where Q is total charge, C is capacitance and V is voltage. The capacitance then is a proportionality constant, relating the voltage drop between the plates to the charge on the plates.

The specific value of the capacitance is a function of the physical structure of the device. The capacitance of an ideal parallel plate capacitor is determined from the following parallel plate equation:

$$C = \in A/d$$

where $\in$ is the permittivity of the dielectric material ($\in = \in_r \in_o$, where $\in_r$ is the dielectric constant), A is the area of the plate, and d is the distance separating the plates.

FIG. 1 is a drawing of a parallel-plate capacitor. From the parallel-plate equation, the value of the capacitor can be increased by increasing the dielectric constant of the dielectric material, increasing the area of the metal plates, or decreasing the distance separating the plates.

FIG. 2 shows a parallel-plate capacitor with a positive voltage applied to the top plate and a negative voltage applied to the bottom plate. As can be seen, the electric field crosses the dielectric, offset by an induced charge in the dielectric (polarized dielectric), the amount of which depends on the dielectric constant of the dielectric material.

For comparison purposes, it is useful to calculate the area required to create a one-farad parallel-plate capacitor (PC), using the separation distance between the plates as a variable. Table 1 shows the different areas required for various separation distances. 39 million square meters is required for a 1 farad capacitor if the distance separating the plates is 1 mm. For a separation distance of 1 nm, the size required for a 1 farad capacitor would be 39 square meters, which is still a large area but 6 orders of magnitude smaller than the 1 mm separation distance. Hence, decreasing the distance can dramatically decrease the size of a parallel-plate capacitor.

TABLE 1

Area of one farad parallel-plate capacitor*

| Area (square meters) | Separation Distance (meters) | Capacitance (farads) |
|---|---|---|
| $39.0 \times 10^6$ | 1 mm | 1 F |
| $0.47 \times 10^6$ | 12 μm | 1 F |
| $39.0 \times 10^3$ | 1 μm | 1 F |
| 39 | 1 nm | 1 F |

*Assumes dielectric constant of 2.9 PC.

Another comparison can be made by fixing the area of the capacitor and varying the distance between the plates, choosing the size used in the experiments for the PC membrane. Table 2 shows different capacitor values for a one square centimeter parallel-plate PC capacitor, again varying the separation distance between the plates. For a separation distance of 12 μm, the capacitance is 214 pF.

TABLE 2

Capacitance of square centimeter parallel-plate capacitor*

| Area ($cm^2$) | Separation Distance (meters) | Capacitance (farads) |
|---|---|---|
| 1 | 20 μm | 128 pF |
| 1 | 12 μm | 214 pF |
| 1 | 1 μm | 2.57 nF |
| 1 | 100 nm | 25.7 nF |
| 1 | 1 nm | 2.57 μF |

*Assumes dielectric constant of 2.9 for PC.

Alternatively, the value of capacitance can increase if the area of the electrodes is increased without necessarily decreasing the separation. One advantage of capacitors is their ability to quickly provide power when needed. Capacitors are also able to repeatedly charge and discharge, without much degradation in performance. One of the issues with the utilization of capacitors in various applications has been the size of the capacitance. For example, to achieve a one farad capacitance made from parallel-plates with a separation distance of 1 mm and a dielectric constant of one would require a size of 113 million square meters, which is typically difficult if not impossible to achieve.

The following is a list of papers describing work on the generation of advanced capacitors. The entire contents of each of the following are incorporated herein by reference.

1. Cortie, M. B. et al., 2005. "Conduction, Storager, and Leakage . . . ," IEEE Trans. On Nanotechnology, Vol. 4, No. 4, July 2005, pp. 406-414.
2. Ionescu-Zanetti, C. et al., 2006. "Nanogap capacitors . . . ," J. of Appl. Phys., 99, 024305, (pp. 024305-1-024305-5).
3. Stengel. S. and N. A. Spaldin. 2006. "Origin of the dielectric . . . ," Nature, Vol. 443, pp. 679-682.
4. Sohn, J. I. et al. 2005. "Fabrication of high-density . . . ," Appl. Phys. Letters 87, 123115 (pp. 123115-1-123115-3),
5. Klootwijk, J et al. 2006. "Extremely High-Density Capacitors with ALD High-k Dielecric Layers,". pp. 17-28, in Defects in High-k Gate Dielectric Stacks, Edited by E. Gusev, Published by Springer Verlag.

6. Kemell, M. et al. 2007. "Si/Al2O3/ZnO:Al capacitor arrays in electrochemically etched Si . . . ", Microelectronic Engineering 84, pp. 313-318.
7. Black, C. T., et al. 2004, "High-capacity, Self-Assembled MOS Decoupling Capacitors," IEEE Electron Device Letters, vol. 25, No. 9, pp. 622-624.

Capacitors described in the above papers (1-4) were built using technologies which are different than those described here. Moreover, the capacitors described in the papers (5-7) were built in silicon, and have applications in microelectronics, primarily as bypass capacitors.

Further work relevant to the various techniques described herein are described in the following papers, the entire contents of each of the following are incorporated herein by reference.

8. Lee, J., K. Batley, and O. A. Palusinski, 2005. "Electrodeposition in Nanostructure Templates Using Novel Cathode Preparation," *Electrochemical Transaction*, Vol. 1(12), 25.
9. Enculescu, I., Z. Siwy, D. Dobrev, C. Trautmann, E. M. Toimil-Molares, R. Neumann, K. Hjort, L. Westerberg, R. Spohr, 2003. "Copper nanowires electrodeposited in etched single-ion track templates," *App. Phys. A: Mater. Sci. Process.* 77, 751-755.
10. Siwy, Z., A. Fuliński. 2002. "Fabrication of a Synthetic Nanopore Ion Pump," *Phys. Rev. Lett.* 89, 198103 (1-4).
11. Siwy, Z., 2006. "Ion Current Rectification in Nanopores and Nanotubes with Broken Symmetry—Revisited," *Advanced Functional Materials*, 16, 735-746.
12. J. Lee, K. Batley, and O. A. Palusinski, 2006. "Electrical Characterization of Nano Structured Energy Storage Device," *Electrochemical Transaction*, Vol. 2, in printing.
13. Guzman, R., J. Lee, O. A. Palusinski, Z. Siwy, 2004. "Universal Bonding Structure for Electronic Chips and Packages—Nano-scale interconnects," *Invention Disclosure, Univ. of Arizona, Office of Technology Transfer.*
14. Lee, J., K. L. Bartley, and O. A. Palusinski, 2004a. "Gold Nano-structures Built in Polycarbonate Templates," *Interim Report, Dept. of ECE, University of Arizona.*
15. Lee, J., K. L. Bartley, and O. A. Palusinski, 2004b. "Fabrication of Gold Nano-Wires via Electrodeposition in Templates," *Interim Report, Dept. of ECE, University of Arizona.*
16. Lee, J., Z. Siwy, K. L. Bartley, T. Zhu, D. Zhang, and O. A. Palusinski, 2004. "Nano Wire Fabrication Using Templates," *Interim Report, Dept. of ECE, University of Arizona.*
17. Masuda, H., H. Yamada, M. Satoh, H. Asoh, M. Nakao, and T. Tamamura, 1997. "Highly ordered nanochannel-array architecture in anodic alumina," *Appl. Phys. Lett.* 71 (19), 2770-2772.
18. Jessensky, O., F. Müller, and U. Gösele, 1998. "Self-organized formation of hexagonal pore arrays in anodic alumina," *Appl. Phys. Lett.* 72 (10), 1173-1175.
19. Vetter, J. and R. Spohr, 1993. "Application of ion track membranes for preparation of metallic microstructures," *Nucl. Instrum. Methods Phys. Res., Sect. B,* 79, 691-694.

BRIEF DESCRIPTION OF THE DRAWINGS

A more complete appreciation of the invention and many of the attendant advantages thereof will be readily obtained as the same becomes better understood by reference to the following detailed description when considered in connection with the accompanying drawings, wherein:

FIG. 21 is a flowchart of a method for making an interdigitated capacitor according to one embodiment of the present invention;
FIGS. 23A-23I are schematic depictions of various stages a PET membrane being prepared using an ion bema process according to one embodiment of the present invention.

DETAILED DESCRIPTION OF THE INVENTION

The present invention addresses problems with conventional capacitors by using nano-technology to construct capacitors having large effective areas. Further, the present invention results in unexpectedly large values of capacitance (i.e., values which exceed the predicted capacitances based on electrode area estimates). These higher than expected capacitance values mean that the nano-scale capacitors of the present invention have the potential to store and deliver larger quantities of charge to potential devices.

The capacitors built using the various embodiments of the present invention can be used as replacement for batteries of various kinds, as well as back-up storage for solar cells or fuel cells, as well as by-pass capacitors to attenuate perturbations in electronic circuits and devices, and other applications that require storage of electrical energy.

Advantages of the energy storage devices of the present invention in comparison to batteries are: faster charging, longer life time (in terms of number of charge/discharge cycles, and substantially higher energy efficiency due to negligible internal power dissipation. Other advantages include low cost of materials and fabrication and elimination of toxic chemicals used in batteries. For example, in the replacement of automotive batteries, the energy storage devices of the present invention can be assembled in arrays with parallel and series connections to supply sufficient power at required voltage.

Described below by way of illustrative embodiments are structures and methods of the present invention to realize nano-scale capacitors.

Membrane-Template Structures

The concept of a nano-scaled digitated capacitor results from the development of membrane-template nano structures. Membrane-template structures used in the present invention include a porous material where the diameter of the pores is in the nanometer range. The porous material includes tunnel-like openings (e.g., holes or pores) that extend completely through the material from one side of the material to the other side of the material. Each pore includes an opening on one side of the material and an opening on the other side of the material. Throughout this disclosure, the terms holes, tunnels, and pores are used interchangeably. Typical ranges of sizes for the energy storage devices of the present invention are: 1 cm² to 20 cm² surface area, with 10 μm to 100 μm thickness, and pore diameters in the range 10 nm to 600 nm. Other sizes are certainly possible and not precluded by the present invention. Exemplary materials for use in a membrane-template structure are polycarbonate (PC), polyethylene (PET) and aluminum oxide material ($Al_2O_3$).

Figure 1:
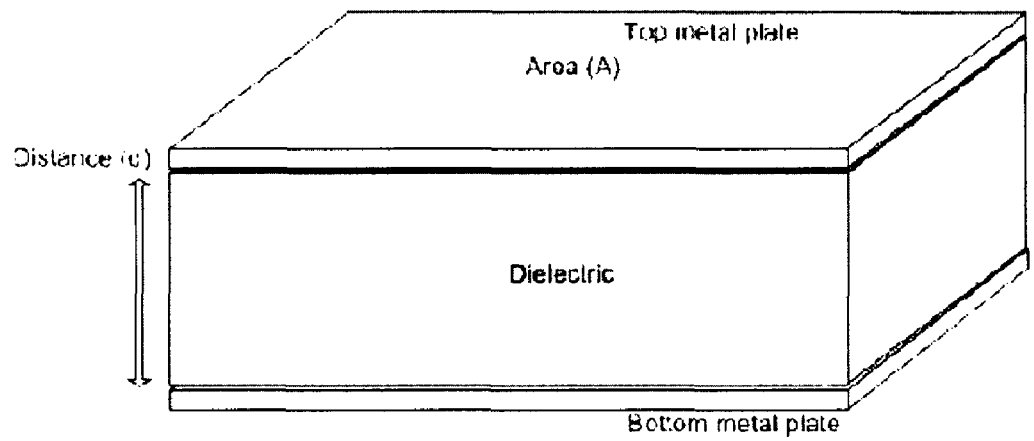
FIG. 1 is a conventional parallel plate capacitor.
Figure 2:
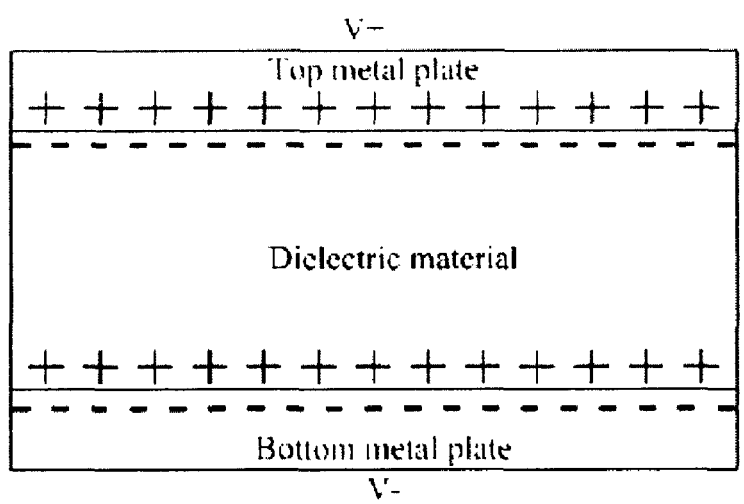
FIG. 2 depicts an electric field and charge of a conventional parallel-plate capacitor.
Figure 3:
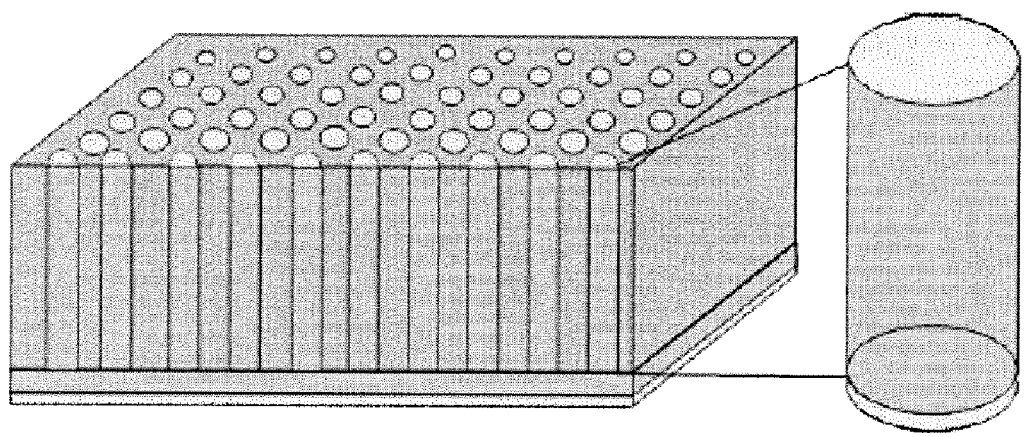
FIG. 3 is a membrane-template structure according to an embodiment of the present invention.

Referring now to the drawings, wherein like reference numerals designate identical, or corresponding parts throughout the several views, and more particularly to FIG. 3 thereof, FIG. 3 is a drawing of a template structure 300 filled with gold as a conductive material. The bottom of the membrane-template structure includes metal plate 301 created for example by physical vapor deposition (PVD) that can include one (gold) or several layers (gold-copper-gold). Metal or conducting polymers may be inserted within the pores 302. The metal may be inserted to fill or partially fill the pores. Electrodeposition is one method to fill the pores, and the process is described below. Other methods which could be used to fill the pores include electroless deposition and atomic layer deposition.

After depositing the metal in the pores, a metal rod structure is created within the pores. The metal rod structure may comprised entirely of metal, and the metal in the rod may be in contact with an inside surface of the corresponding pore.

In order for the membranes to be electrodeposited with a metal, one electrode is disposed on the membrane to act as a cathode. Physical vapor deposition (PVD) or other techniques may be used to deposit metal on one side of the membrane. This metal layer may include a layer of gold (approximately 250 nm thick) or layers of gold-copper-gold (approximately 250 nm-500 nm-250 nm thick) for gold deposition, or gold-copper if the electrolyte was formed from the copper salt. This multilayered process protects the interior copper from oxidation. Copper provides an inexpensive material, and a thick layer of Cu can be deposited on the porous membrane to help prevent electrolyte leakage through the membrane.

Figure 4:
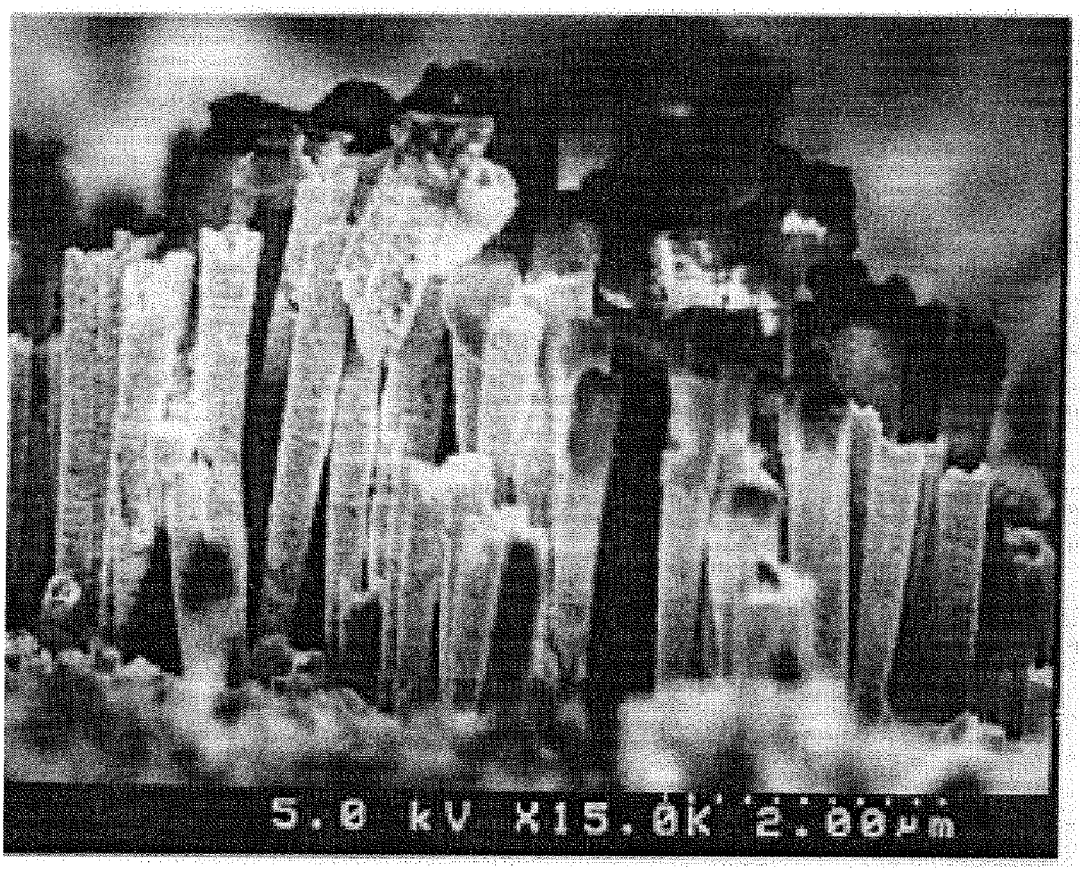
FIG. 4 is an image of gold rods in membrane.

FIG. 4 shows an image of actual rods created inside a PC membrane. FIG. 4 shows rods formed initially in the membrane material and from which the membrane was removed selectively, leaving exposed rods for viewing.

In electrodepositing metal into the pores of a membrane, a test was performed to confirm that the pores were filled. Using the PVD layer on one side of the membrane and overplating from the electrodeposition process on the other side, which is itself an indication that the pores have been filled with metal, the resistance and therefore the conductivity of a membrane can be measured. Resistivity of a piece of wire has the following formula:

$$R = \frac{\rho L}{A}$$

where ρ is the resistivity of the metal, L is the length of the pore or wire (which equals the thickness of the membrane), and A is the cross-sectional area of the wire. Using a resistivity of $2.463 \times 10^{-8}$ Ω-m for pure gold as an example, the resistance of a single pore with diameter 200 nm and length 12 μm would be 9.41Ω. (The total resistance was measured on this basis from which the resistance of single rod was estimated.)

Different types of example membrane materials are described in more detail below.

Figure 5A:
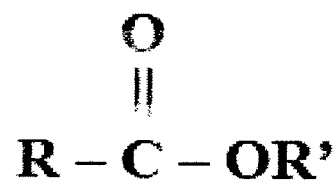
FIG. 5 shows structural characteristics of materials that can be used as a membrane according to an embodiment of the present invention.

Polyethylene terephthalate (PET): PET is a plastic used to produce bottles for soft drinks. Also, it is used as a dielectric in film capacitors. It is a lightweight but strong material. It can be transparent or opaque, and is 100% recyclable. Chemically, PET is a saturated polyester, where the ester functional group has the form shown in FIG. 5A. Esters have two oxygen atoms attached to the carbon, one with a double-bond and the other with a single bond. The other single bond is attached to a functional group (R). Examples of esters are fats and vegetable oils. PET has a melting temperature between 260-280° C. PET is also considered a good dielectric material, with a dielectric "constant" of about 3.

The pores in the PET membranes may be produced by heavy ion bombardment (uranium or gold). The PET membranes may be produced by the track-etching technique described by R. L. Fleischer, P. B. Price, R. M. Walker, in *Nuclear Tracks in Solids. Principles and Applications*, Univ. of California Press, Berkeley 1975, the entire contents of which are incorporated herein by reference. Briefly, the process entails exposing the membrane to the beam of heavy ions accelerated in a linear accelerator or a cyclotron to the total kinetic energies of ~2 GeV, therefore ~10% velocity of light. The swift heavy ions go through the foils leaving behind latent tracks, therefore local, cylindrically shaped damaged zones that can be subsequently etched to desired shapes and sizes in the process of the chemical etching. Each heavy ion produces one latent track that after the chemical etching produces one pore. The number of ions incident on the sample is therefore equal to the number of pores created in the process. The diameters of the ions are at the Angstrom level and the size of the pores after ion bombardment is increased to a desired radius by chemical etching using sodium hydroxide (NaOH). The longer the etch time, the larger the pore diameter will be. The diameter of pores may range from 10 nm to 200 nm. The thickness of the membranes ranged from 12 μm to 19 μm.

Figure 5B:
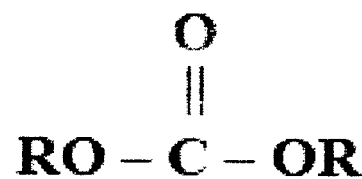

Polycarbonate (PC): PC like PET, is a common plastic material used to make such things as eyeglasses, shatterproof windows, and high-voltage electrical plugs. It is also used as a dielectric in film capacitors. Chemically, it is a chain of carbonates, where there is a double covalently bonded oxygen atom and two single bonded oxygen atoms to which other structures may attach as shown in FIG. 5B.

Polycarbonate filters are easily obtainable from several manufactures, and can be used as membrane-templates. The manufacturer Whatman, Inc., (Whatman International, Ltd., Maidstone, England) for example, makes round membranes that have a diameter of 25 mm and thickness on the order of 10 to 20 microns. These membranes are available in several pore diameter sizes, with 20 nm, 100 nm, 200 nm, and 600 nm as examples. The 200 nm pores have a pore density of $3\times10^8/\text{cm}^2$, while the 600 nm size pores have a density of $3\times10^7/\text{cm}^2$. Pore density is a function of pore diameter, so the smaller the pore sizes, the larger the number of pores in a given area. The net effect is that the total pore area is approximately the same for the two different pore size membranes, 9.4 μm² for the 200 nm pores and 8.5 μm² for the 600 nm pores (or 9.4% and 8.5% respectively of the total membrane area).

The advantage of PC membranes is that these membranes are easy to obtain and reasonably priced. The disadvantages are that not all of the pores are orthogonal to the surface and the pores are not arranged in a uniform pattern. For controlled applications, polycarbonate membranes can have both orthogonal and uniformly patterned pores. This may be accomplished in a method similar to the way PET membranes are made or by using a focused ion beam (FIB).

A FIB system can use ions such as a $Ga^+$ ion beam to raster over the surface of a PET sample in a similar way as the electron beam in a scanning electron microscope. The ion beam can be used to mill small holes in the sample at well localized sites, so that cross-sectional images of the structure can be obtained or that modifications in the structures can be made. FIB systems are known in the art and their application to the present invention is discussed in more detail below.

Aluminum Oxide ($Al_2O_3$: One problem with PC membranes in general is that PC membranes tend to be fragile and tear easily. One alternative is alumina or aluminum oxide. Aluminum oxide can be created by an anoxidation process applying a positive voltage to aluminum in an electrolyte, where aluminum is the anode. This process removes electrons from the surface and creates metal ions, which can react with water to form an oxide, as in the following chemical reaction:

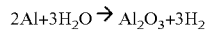

$$2Al + 3H_2O \rightarrow Al_2O_3 + 3H_2$$

Figure 5C:
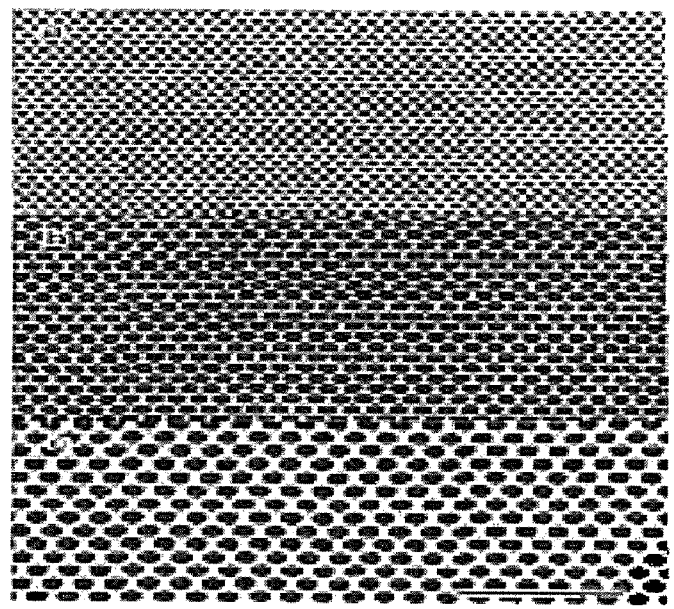

If an acid such as oxalic acid is used as the electrolyte, pores can be created. It has been shown that pore location can be specified. For example, a silicon-carbon (SiC) mold (electron beam lithography) with an array of hexagonal convex structures can be pressed against an aluminum surface, leaving a concave pattern on the aluminum. The result is pretreated aluminum that when anodized results in an array pattern. Further, pore diameter can be controlled by anodization voltages. FIG. 5C shows different size pores for different applied voltages.

When pores are created in $Al_2O_3$, the pores are located in a so-called cell center of hexagonal cells. Commercial grade material may be used with a thickness of 60 μm or another thickness. One advantage of $Al_2O_3$ is the ability to control the pore size and location. A range of pore sizes from 10 nm to 600 nm, regardless of membrane type, is especially well suited for providing extensive increases in the surface area of the capacitor membranes.

High dielectric membranes: PET, PC, and alumina have low dielectric constants usually between 1 and 10. However, materials with higher dielectric constants can also be used. For example, titanium oxide has a dielectric constant that is roughly between 40 and 50. Other suitable high dielectric materials include barium titanate and lead zirconiuim titanate, which have dielectric constants in the range of 100-1000. For high dielectric materials available in porous form, the available materials can be directly used. For high dielectric materials unavailable in porous form, techniques such as the FIB process can be used to create pores in the high dielectric material prior to electrode deposition and pore fill. For other membrane materials, such as for example titanium, oxidation of titanium yields porous membranes suitable for fabrication of energy storage devices of the present invention. In these membranes, conducting rods of metal are deposited inside through for example an electrochemical reduction of that metal from a solution. The conducting rods can also be made from other materials, like semi-conductors or polymers.

The Digitated Capacitor

Figure 6:
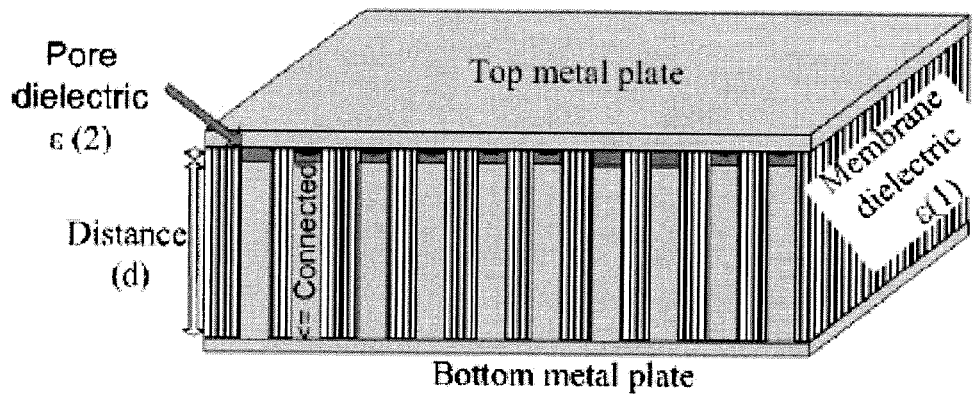
FIG. 6 shows a digitated capacitor according to an embodiment of the present invention.

The design of a digitated capacitor follows from the development of the membrane-template structure. A drawing of the digitated capacitor is shown in FIG. 6. The digitated capacitor 600 includes a bottom metal plate 601, a membrane 602 having a membrane dielectric $\in(1)$, pores 603 filled with a conductive material 604, and top metal plate 605. There is a distance d between the bottom metal plate and the top metal plate.

In one example, a PVD layer or silver print is used on one side of the membrane to act as a cathode for the electrodeposition process. The electrolyte used for copper deposition was composed of 0.5 M of cupric sulfate and 2 ml of sulfuric acid in 20 ml of plating solution volume. Gold was deposited from the solution containing 20 g/l HAuCl4 and 0.5 M sodium chloride as supporting electrolyte. All chemicals in this example were of reagent grade. A Princeton Applied Research EG&G 273 potentiostat connected with an IBM PC was used for electrochemical experiments and capacitance measurement. Copper tape was used to contact the cathode (PVD or silver print layer) to the potentiostat for deposition and characterization. The nanowires or nanorods in the pores were deposited by applying a constant voltage of −50 to −500 mV versus rest potential for 3 to 10 minutes.

To create a digitated capacitor, the electrodeposition process is stopped before the metal rods reach the surface (before overplating can occur). To complete the capacitor, a second parallel-plate electrode that can be made of silver print placed on the bare membrane side. As indicated in FIG. 6, there are two dielectrics in the structure. The first with permittivity $\in(1)$ is the membrane material and the second dielectric, $\in(2)$ is air, even though it could be made of another insulating material. For instance, the air may be replaced by a dielectric material having a high dielectric constant and high dielectric strength. Examples of suitable solid materials are various polymers such as polyxylene polymers, glass, porcelain, etc. Examples of suitable gaseous materials are nitrogen and sulfur hexafluoride.

Figure 7:
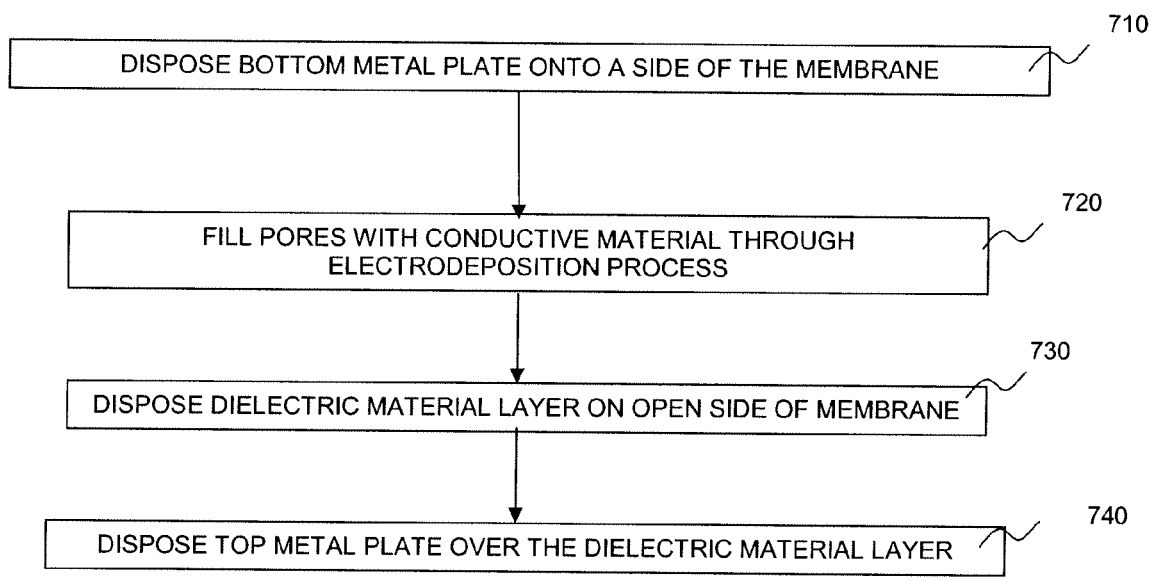
FIG. 7 shows a method for making a digitated capacitor according to the present invention.
Figure 8A:
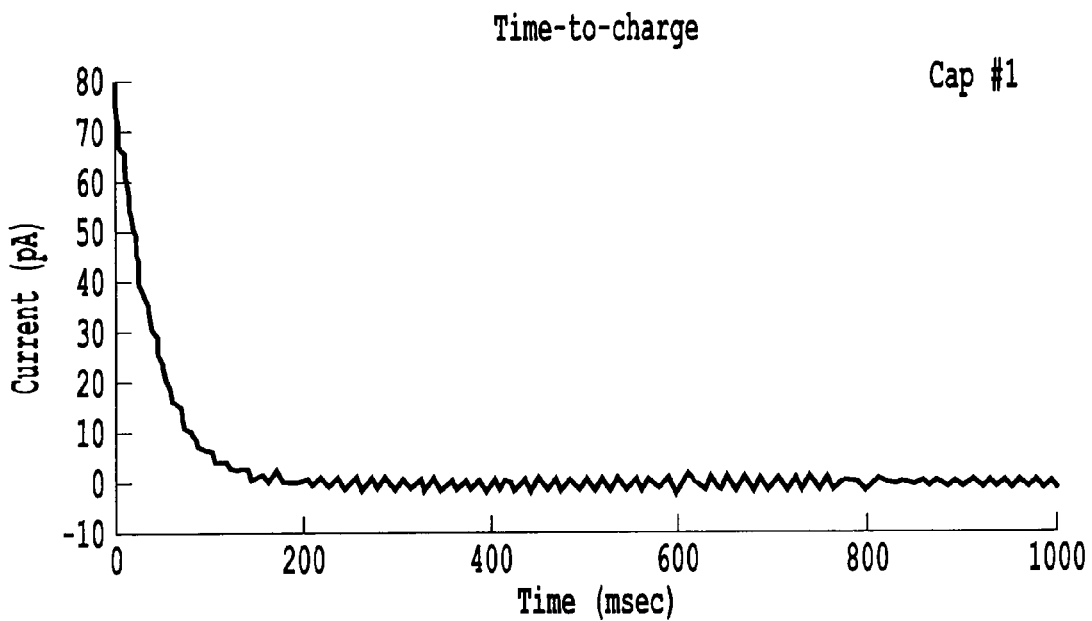
FIGS. 8A-8D show time to charge curves for a digitated capacitor according to an experiment on increased deposition time.
Figure 8A:
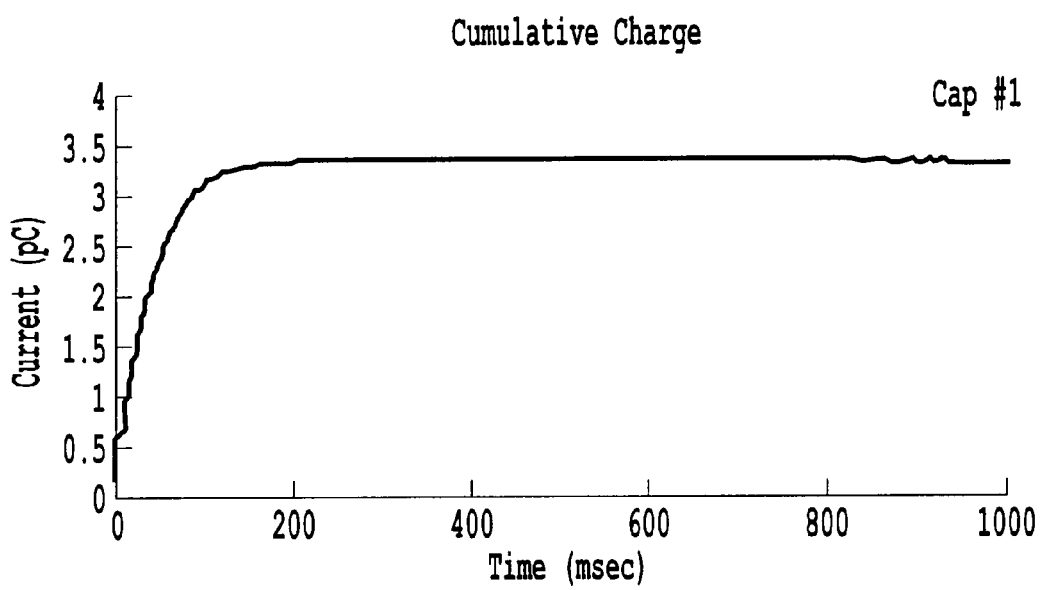
Figure 8B:
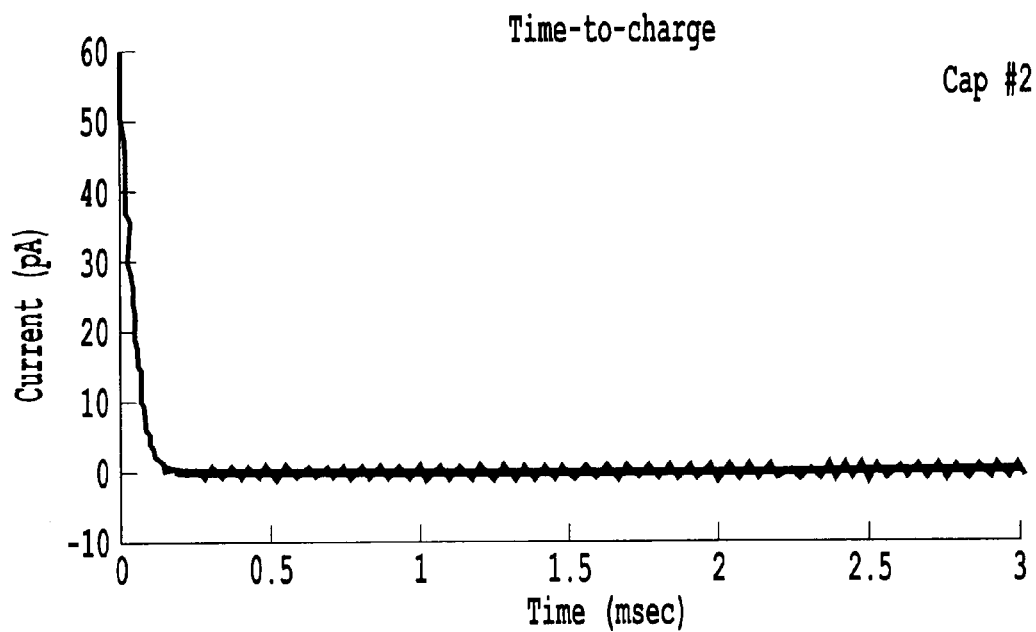
Figure 8B:
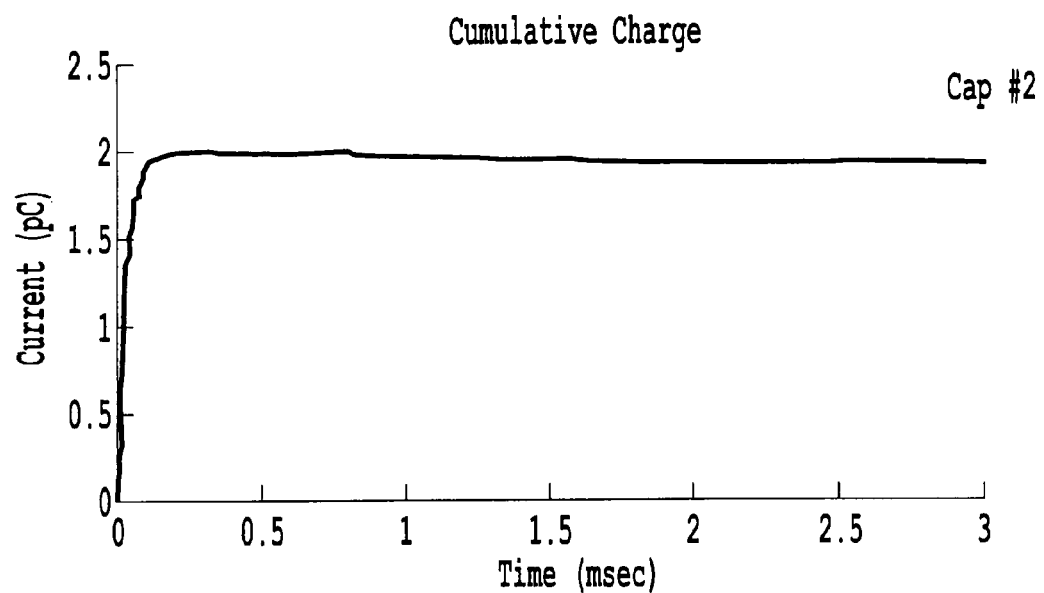
Figure 8C:
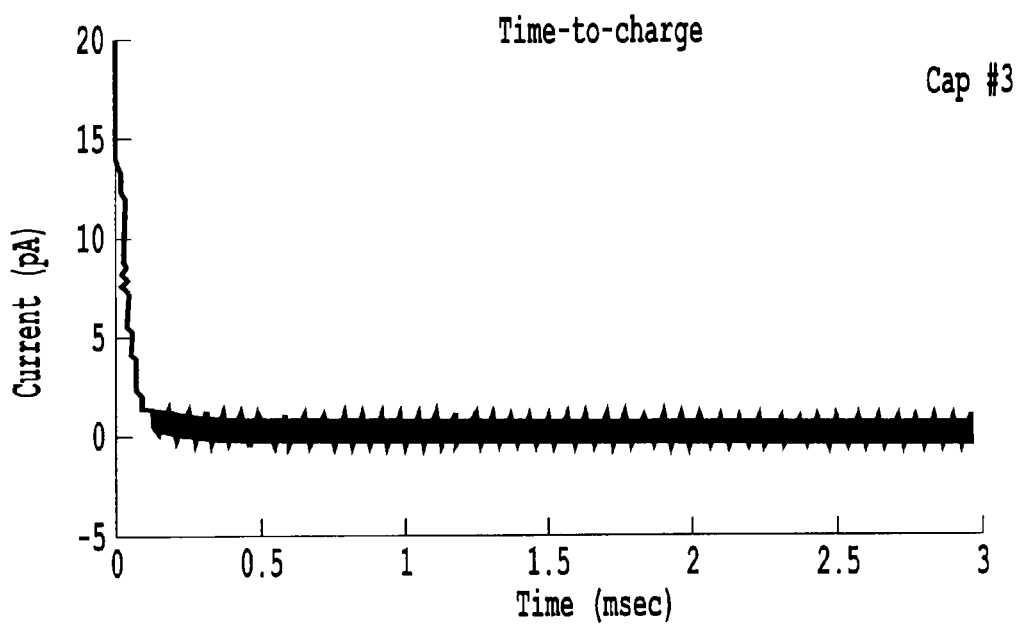
Figure 8C:
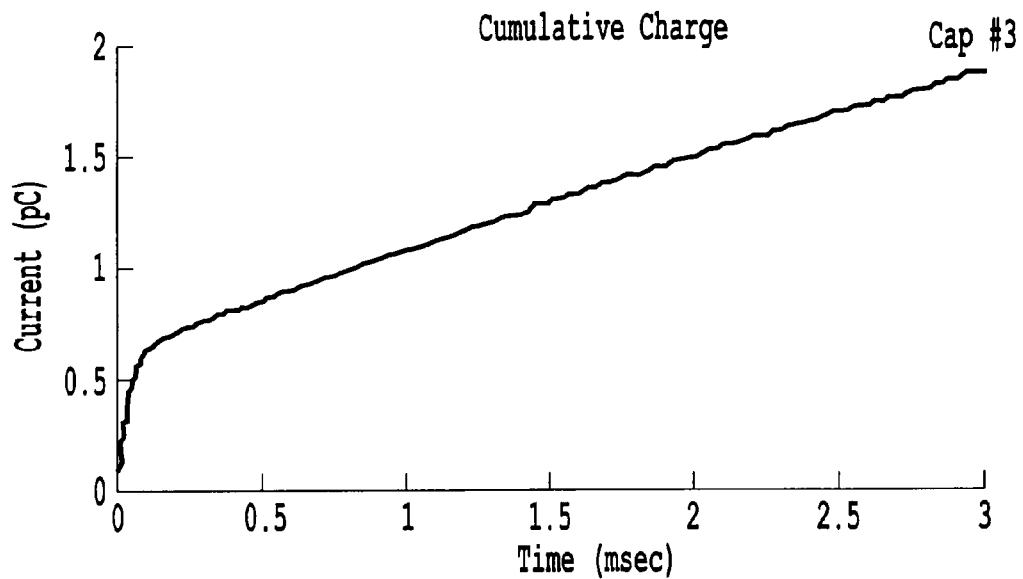
Figure 8D:
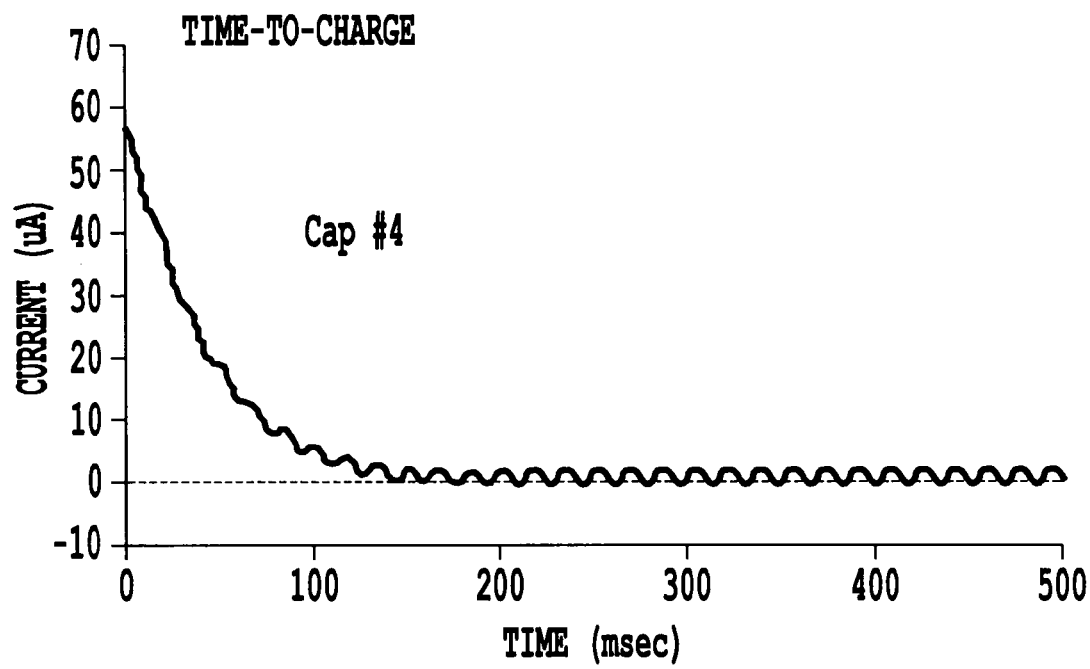
Figure 8D:
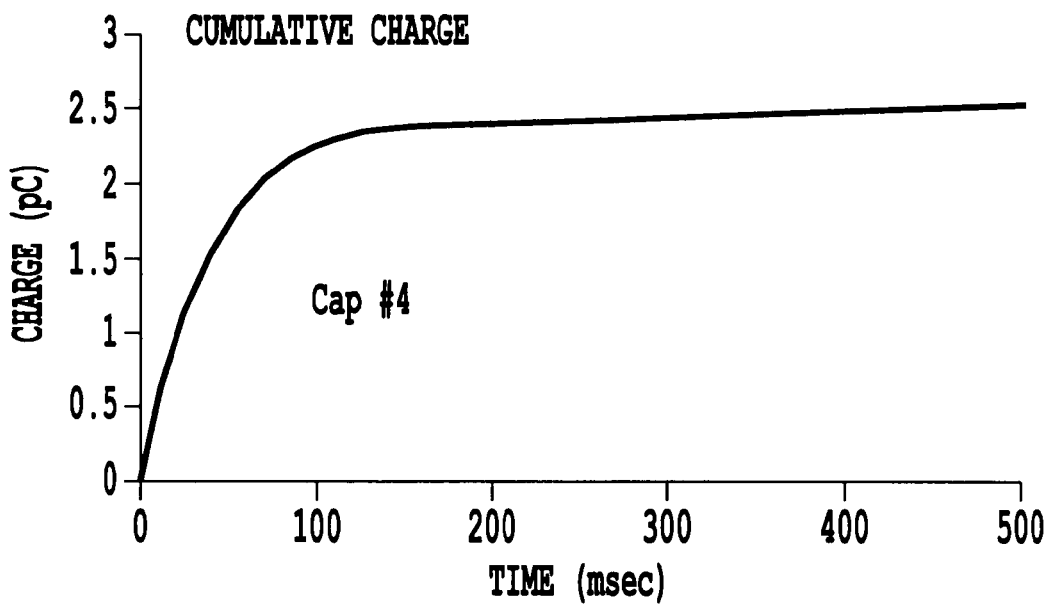

The method of making the digitated capacitor, which includes the method of making the membrane-template structure, is described in the flowchart of FIG. 7. In step 710, the bottom metal plate is disposed onto one side of the membrane, which has pores in the nanometer range as discussed above for the different types of membrane materials. The range of pores is size typically is 10 nm to 60 nm. In step 720, the pores are filled with conductive material through the electrodeposition process which was described above. At this point the membrane-template structure is complete. In step 730, a dielectric material layer is applied to an opposite side of the membrane. To complete the digitated capacitor, a top metal plate is applied on top of the dielectric material layer in step 740. As mentioned above, it may also be necessary to verify in a specific deposition procedure (to be used in fabrication) that the pores have been filled with conductive material by measuring a conductivity of the membrane.

Capacitance Calculations

Using the formula for a parallel-plate capacitor, it is possible to determine the area of the digitated capacitor and approximate the capacitance. The dimensions are provided in Table 3.

TABLE 3

Dimensions of a digitated capacitor

| | |
|---|---|
| Area of membrane | 1 cm$^2$ |
| Pore density | 3 × 10$^8$ pores/cm$^2$ |
| Pore diameter | 200 nm |
| Membrane thickness | 12 μm |
| Length of rod | 11 μm |
| Dielectric constant of PC (Er) | 2.9 |

The calculation of the capacitance of the digitated capacitor can be broken down into three parts: (1) the capacitance of the metal pore area (end of the rod); (2) the capacitance of the metal plate without the pores; and (3) the capacitance of the cylindrical area (without the end of the rod). The breakout of the area is given in Table 4. The area of the digitated capacitor is about 21.7 times the area of the parallel-plate capacitor.

TABLE 4

Area of digitated capacitor

| Area | cm$^2$ | Percent of total |
|---|---|---|
| Pores (πr$^2$) | 0.094 | 0.4% |
| Template (no pores) | 0.906 | 4.2% |
| Parallel plate capacitor | 1.0 | 4.6% |
| Cylinder (2πrl) | 20.7 | 95.4% |
| Total digitated capacitor | 21.7 | 100.0% |

To approximate the capacitance, the following assumptions were made. First, the membrane is made of polycarbonate so the dielectric constant was assumed to be 2.9. The dielectric between the end of the rods and the metal plate is air, so the constant was assumed to be 1. Secondly, the thickness of dielectric layer ∈(2) is 1 um. Finally, a rough approximation is made to calculate the contribution of the electric field between the cylindrical rod area and the metal plate. The distance from the cylinder to the opposite plate is approximated as half the rod length or 6 μm plus 1 μm of added dielectric. Also, the angle of the electric field is approximated as 45° from the cylinder to the metal plate. A breakout of the capacitance calculation is provided in Table 5. The capacitance of 6,066 pF compares favorably to that of the parallel-plate capacitor, whose capacitance was 214 pF.

TABLE 5

Capacitance of digitated capacitor

| Capacitance | pF | Percent of total |
|---|---|---|
| Pores | 83 | 1.4 |
| Template (no pores) | 194 | 3.2 |
| Cylinder | 5,789 | 95.4 |
| Total capacitor | 6,066 | 100% |

This result is important. Conceptually, the capacitance should be larger just because of the added area of the cylinder walls provided from the rods. The capacitance of the digitated capacitor is roughly estimated at 6.1 nF, significantly larger then the 214 pF provided by the parallel-plate capacitor. Also, the efficiency factor ($\eta_{vol}$) is 0.18 for the parallel-plate capacitor and 5.1 for the digitated capacitor. The implication is that, with a more dense structure (increase in pore density), use of a higher dielectric besides PC and air, and a gap of 1 μm or less between the rod ends and the electrode, the capacitance can be made even larger. One density of pores suitable for the present invention is in a range ($10^8$ to $10^{12}$) pores/cm$^2$. The gap can be filled with a dielectric material of high dielectric constant and high dielectric strength (high resistance to breakdown due to exposure to electric field).

Refinements

A process has been developed to allow for a quick and cost effective turnaround time on building cathodes for nanostructure membranes. Commercially available nickel or silver print serves as a cathode and eliminates the need for PVD layers. The silver print can be applied in a matter of minutes with drying time also on the order of minutes. Electrodeposition turn-around time can therefore be completed quickly as compared to PVD electrode fabrication. Conductivity tests confirmed successful deposition into the PC membrane porous structure of copper metal using this novel cathode formation process. Other deposition materials such as different metals and conducting polymers can also be exploited with this technique.

The conductive print used above in these examples included commercially available nickel or silver print (MG Chemicals: 840-20 g, 842-20 g) which is "painted" on one side of the membrane to act as the cathode electrode for electrodeposition of the pore metal. The conductive print includes metal particles, (nickel or silver metal: 30-60%; toluene: 7-13%), and the required drying time for the print is a minimum of 10 minutes.

To avoid the leaking of the painted electrolyte onto the sidewalls of the membrane, a Teflon beaker was attached to the side of the membrane, and to improve conductivity of the silver print to the copper tape electrical connector, commercially available gold medallion seals (Avery Notarial Labels, 2" diameter) were used. While the conductivity of the metal seals turned out to be somewhat poor, the seals had excellent adhesion that provided a leak-proof deposition process (i.e., no deposition of the electrode material onto the membrane side wall).

Analysis and Testing

For a baseline analysis, membranes with no rods were tested (only top and bottom electrodes). Experiment 1 provides the first data showing that the digitated capacitance is larger than the parallel-plate capacitance. Experiment 2 uses copper and silver print rather than PVD. Measurements were taken using a DVM (Digital Volt Meter) 638 Multitester, which has the ability to measure capacitance.

EXPERIMENT 1

Digitated Capacitor

Both a PC membrane and PET membrane were tested in this example. There was no silver print electrode on one side of the membrane surface. Copper tape held by a weight was used as the electrode (the other side was PVD).

Supplies and Equipment:
1. PC and PET membranes pre-filled with gold.
2. Capacitance measuring device—DVM 638 Multitester.
3. Copper tape ¼ inch width (electrodes).
4. PVD layer of the membrane served as one electrode.

Results:

The measured results demonstrate a higher capacitance for the digitated PC and PET membranes, as shown in Table 6. The closed-formed solution of a parallel plate PC capacitor should be approximately 214 pF (for a square centimeter with a dielectric constant of 2.9). The measured value was 21.4 pF, off an order of magnitude. For the PET capacitor, the value should be 221 pF, and the measured value was 11.3 pF. The lower value is likely due to the copper tape not lying completely flat on the membrane.

The capacitance for the digitated capacitors was 79.0 pF and 71.9 pF respectively.

TABLE 6

First capacitance measurements

| Cap # (Date: Jan. 13, 2005) | Type | Pore (Diameter/Thickness) | Type | Capacitance (pF/cm$^2$) |
|---|---|---|---|---|
| #1 | PC | 200 nm/10 μm | Parallel-plate | 21.4 |
| #2 | PC | 200 nm/10 μm | Digitated | 79.0 |
| #3 | PET | 100 nm/12 μm | Parallel-plate | 11.3 |
| #4 | PET | 100 nm/12 μm | Digitated | 71.9 |

EXPERIMENT 2

Digitated Capacitor with Longer Metal Rods and Larger Capacitance

Supplies and Equipment:
1. PC membranes, 200 nm diameter pores.
2. Silver print used as electrode.
3. Potentiostat used to deposit copper into pores applying −500 mV.
4. Capacitance measuring device—Scope DVM 638 Multitester and Potentiostat Model 273 FG&G Princeton Applied Research.
5. Copper tape ¼ inch width.

The silver layer of the membrane served as one electrode while copper tape covered the other side.

Results:

Table 7 gives the results for the parallel plate capacitors measured for five different devices, with the average capacitance being 92 pF (standard deviation of +1-19. pF). These results are with no metal in the pores. Again, the values are smaller then the results for the digitated capacitor (Table 1.3), verifying that the digitated capacitor results in a larger capacitance.

TABLE 7

PC parallel-plate capacitors

| Parallel-plate Cap # (Date: Mar. 11, 2005) | Capacitance (pF/cm$^2$) |
|---|---|
| #1 | 94 |
| #2 | 75 |
| #3 | 90 |
| #4 | 123 |
| #5 | 78 |
| Average | 92 |

Results for the digitated capacitors are shown in Tables 8A. The results do not show a strong correlation between deposition time and capacitance.

TABLE 8A

Digitated capacitors deposition time

| Digitated Cap # Date: (Mar. 11, 2005) | Deposition time | Capacitance DVM (per cm$^2$) | Capacitance Time-to-Charge. (per cm$^2$) | Capacitance Difference (per cm$^2$) |
|---|---|---|---|---|
| #1 | 2 min | 264 pF | 335 pF | (71) pF |
| #2 | 5 min | 296 pF | 198 pF | 98 pF |
| #3 | 10 min | 259 pF | 189 pF | 70 pF |
| #4 | 7 min | 9.0 nF | 255 pF | 8.745 nF |
| #5 | 7 min | Short | Short | N/A |

*Calculated from FIGS. 10A to 10D

Additional work has demonstrated a dependence on capacitance with deposition time (see Tables 8B and 8C below).

TABLE 8B

AAO digitated capacitor with 5 different deposition time

| Aluminum Oxide (AAO) | Deposition time | Capacitance DVM(/cm$^2$) | Capacitance Time-to-Charge(/cm$^2$) | Capacitance Difference (/cm$^2$) |
|---|---|---|---|---|
| AL_5MIN | 5 minutes | 198 nF | 115 nF | 83 nF |
| AL_10MIN | 10 minutes | 215 nF | 154 nF | 65 nF |
| AL_15MIN | 15 minutes | 184 nF | 210 nF | 26 nF |
| AL_20MIN | 20 minutes | 464 nF | 330 nF | 134 nF |
| AL_30MIN | 30 minutes | Short | Short | N/A |

Table 8B represents the data from measurements of capacitors fabricated in alumina membranes with successively increased deposition times. Note that with 30 min deposition time the membrane was overplated resulting is "short" between the plates. The alumina membranes are 60 µm thick.

TABLE 8C

PC digitated capacitor with 5 different depositon time

| Poly-carbonate | Deposition time | Capacitance DVM(/cm²) | Capacitance Time-to-Charge(/cm²) | Capacitance Difference (/cm²) |
| --- | --- | --- | --- | --- |
| PC_2MIN | 2 minutes | 84.2 nF | 12 nF | 72.2 nF |
| PC_3MIN | 3 minutes | 71.7 nF | 50 nF | 21.7 nF |
| PC_5MIN | 5 minutes | 103.6 nF | 80 nF | 23.6 nF |
| PC_7MIN | 7 minutes | Short | Short | N/A |
| PC_10MIN | 10 minutes | Short | Short | N/A |

The Table 8C PC represents the data from measurements of capacitors fabricated in polycarbonate membranes with successively increased deposition times. Note that with 7 min deposition time the membrane was overplated resulting is "short" between the plates. The PC membranes were 10 µm thick.

The fragility of the membranes, especially PC and alumina, may have affected the results as both subject to either tears (PC) or breaks (alumina) with the result that the deposition is not uniform.

Time to charge and cumulative charge curves were generated from an RC circuit (17 MΩ resistor in series with the digitated capacitor) using a potentiostat. From the time-to-charge curves and the resulting cumulative charge curves, it is possible to calculate capacitance.

FIGS. 8A through 8D show both the time it takes for the current to charge-up the capacitor (time-to-charge) and the related cumulative charge curves. Capacitance can be calculated from the cumulative charge curves using the formula C=Q/V and knowing that the voltage applied was 10 mV. The results are on the same order of magnitude with the DVM, except for experiment #4 which was much higher using the DVM.

To summarize, the digitated capacitors had a larger capacitance than a comparable parallel-plate capacitor.

Time-to-Charge Analysis

The initial application of a DC voltage source applied to a discharged capacitor results in charging and therefore current flow from the power source to the plates of the capacitor. Indeed, just after the instant voltage is applied (time 0+δ), the capacitor looks like a short and the initial current is equal to the voltage source divided by the resistance in the circuit:

$$I_{t=0+\delta} = \frac{V_{source}}{R_{ckt}}$$

After a very short period of time, steady-state is reached (current stops flowing) and the capacitor's plates are charged up to some maximum value determined by the physical size of the capacitor and the applied voltage. The formula to determine what the capacitor current is at any point in time is given by:

$$i_c(t) = I_0(e^{-t/Tc})$$

where $I_0$ is the initial current and $T_c$ is the time constant. For a circuit where the resistance is in series with the capacitor, $T_c$ equals the resistance times the capacitance ($T_c = R \cdot C$). From the above formulas, it is therefore possible to determine the capacitance.

There are different ways to determine the time-constant from the decaying exponential current curve, but probably the easiest method is to recognize that at five time-constants, the current should be at 99.3% of the final steady-state value (0 amps in this case). Another approach is to take a tangent line to the slope of the curve as it initially decays and look to see at what time it crosses the x-axis. This is derived algebraically below:

$$i(t) = I_0 e^{-t/Tc}$$

Taking the derivative of the slope:

$$di(t)/dt = -I_0/Tc \cdot e^{-t/Tc}$$

Using the formula of a line, $I-I_1=m(t-t_1)$, and solving for $t_0$:

$$0 - I_1 = (-I_1/Tc \cdot e^{-0/Tc})(0-t_1), \text{ then}$$

$$t_1 = Tc$$

Therefore, when the tangent line crosses the x-axis at $t_1$=0 A, the value of $t_1$ is the time-constant.

Figure 9A:
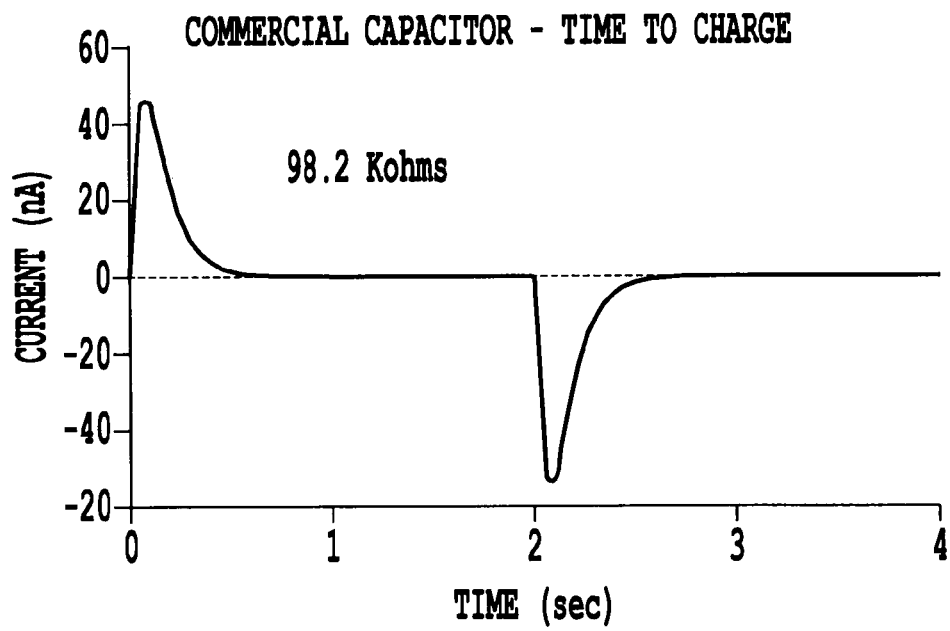
FIGS. 9A-9B show time to charge curves for a commercial capacitor according to experimental results.

Conventional Capacitor:

FIG. 9A provides an example of a time-to-charge curve of a commercial capacitor. The current shows a capacitor that is initially charged with a 10 mV DC source and several seconds later discharged (0 V applied at t=2 seconds). The peak current shown in the graph is 45.3 nA. Using the formula to calculate the peak current, the result is 101.8 nA (I=V/R 10 [mV]/98.2 [KΩ]).

Figure 9B:
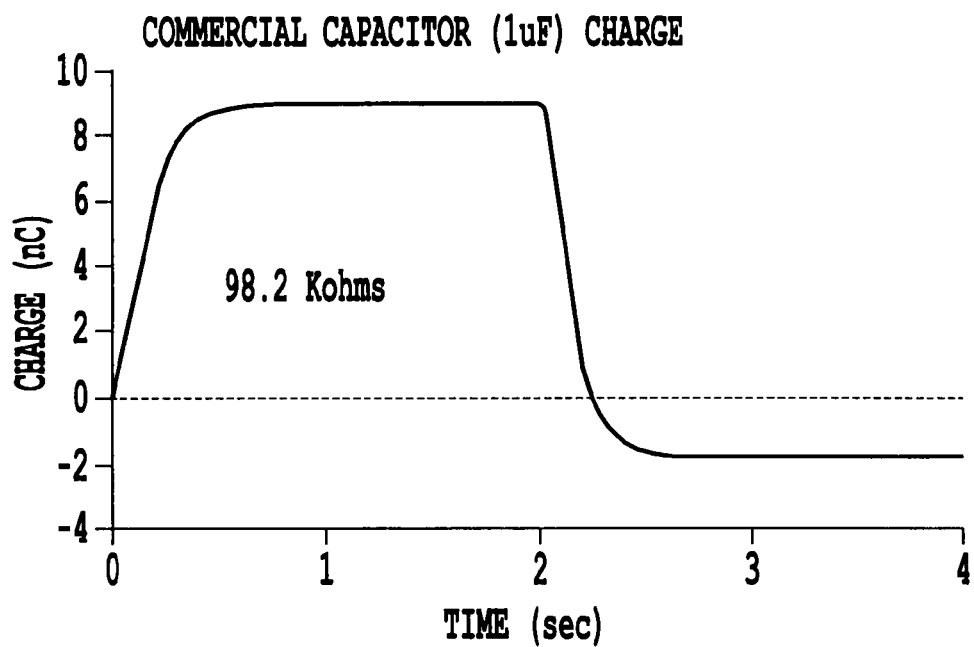

From the information in FIG. 9A, it is possible to determine the capacitance value of a 1 µF commercial capacitor by either finding the time constant or by looking at the total charge. Knowing that the capacitance equals total charge divided by voltage, and that total charge is just the time integral of current, it is possible to determine the capacitance value. FIG. 9B shows the cumulative charge of the commercial capacitor. Since the voltage applied is 10 mV and the peak charge is 8.9 nC, the capacitance is 0.89 µF, fairly close to its 1 µF rating.

Digitated Capacitor:

Below are several experiments using a PC digitated capacitor according to one embodiment of the present invention. The results demonstrate the higher capacitance of the digitated capacitor and provide unique time-to-charge curves. As compared to a commercial capacitor, the time-to-charge, the cumulative charge, the discharge time, and the discharge characteristics all show unexpected and exceptional results.

EXPERIMENT 3

Digitated Capacitor: Time-to-Charge Analysis

A commercial polycarbonate (PC) membrane-template structure was used to build a digitated capacitor. The membrane had 200 nm diameter pores, and a thickness on the order of 12 µm. Copper was the metal used to fill the pores, applying the standard electrodeposition process discussed above.

Figure 10A:
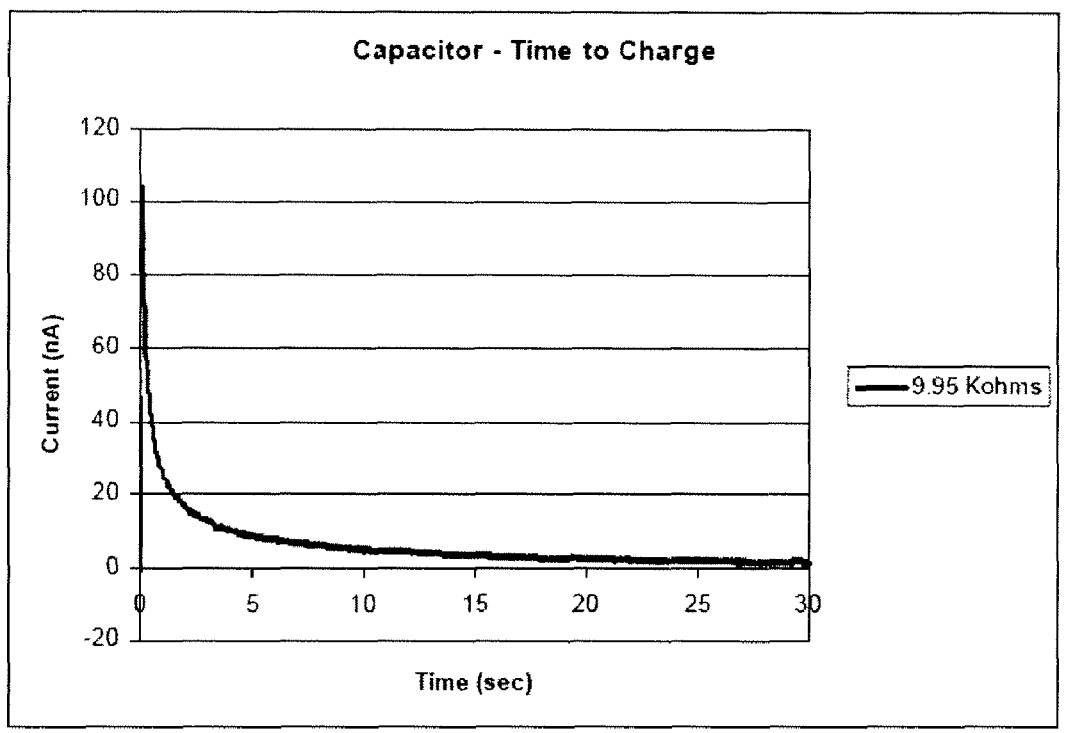
FIGS. 10A-10B show time to charge curves for a digitated capacitor according to experimental results for a thirty second charge period.

FIG. 10A shows the current response versus time to charge of the digitated capacitor with 10 mV DC of applied voltage over a period of 30 seconds with a 9.95 KΩ series resistor. Note the characteristic curve of the capacitor of the present invention as compared to the commercial capacitor of FIG. 9A. While similar to the commercial capacitor, there appears an almost linear decrease over time after an initial exponential decrease. A discussion of the novel discharge characteristics will be discussed later with regard to FIG. 14 where a commercial capacitor discharge is plotted along with that of the present invention. If the exponential portion of this curve is used to approximate the capacitance, steady state is approximately 2 seconds, resulting in a capacitance of approximately 40 µF.

Figure 10B:
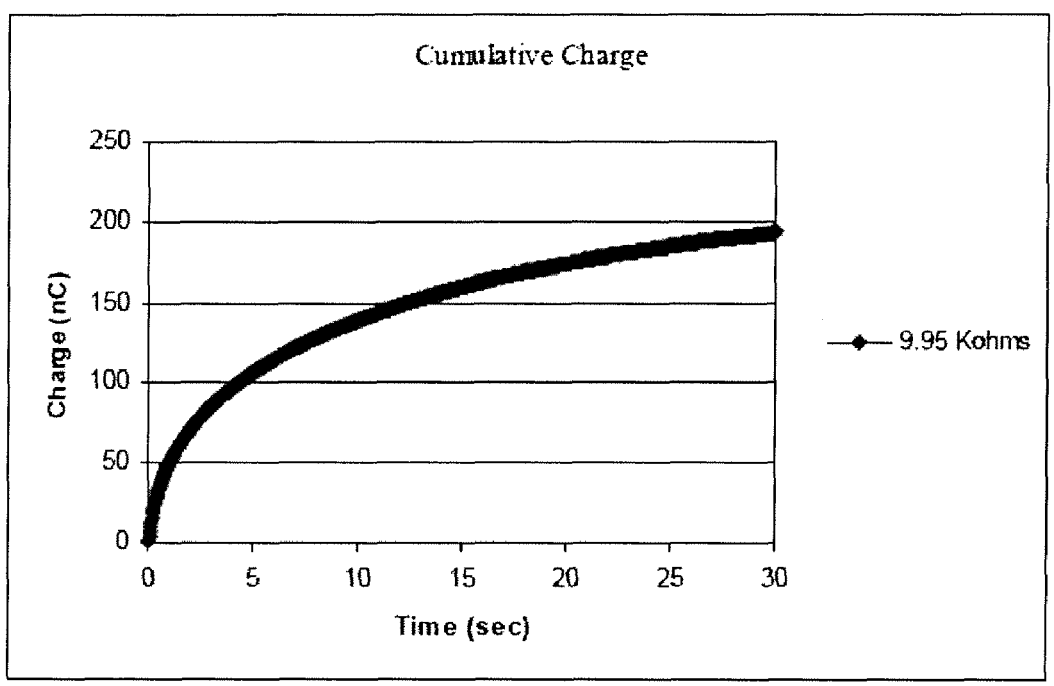

FIG. 10B provides another means of determining the capacitance. Based on this charge curve and using the formula C=Q/V, the capacitance is approximately 19.3 µF (193 nC/10 mV). Even though not 40 µF, this is still an unexpectedly high capacitance.

Figure 11A:
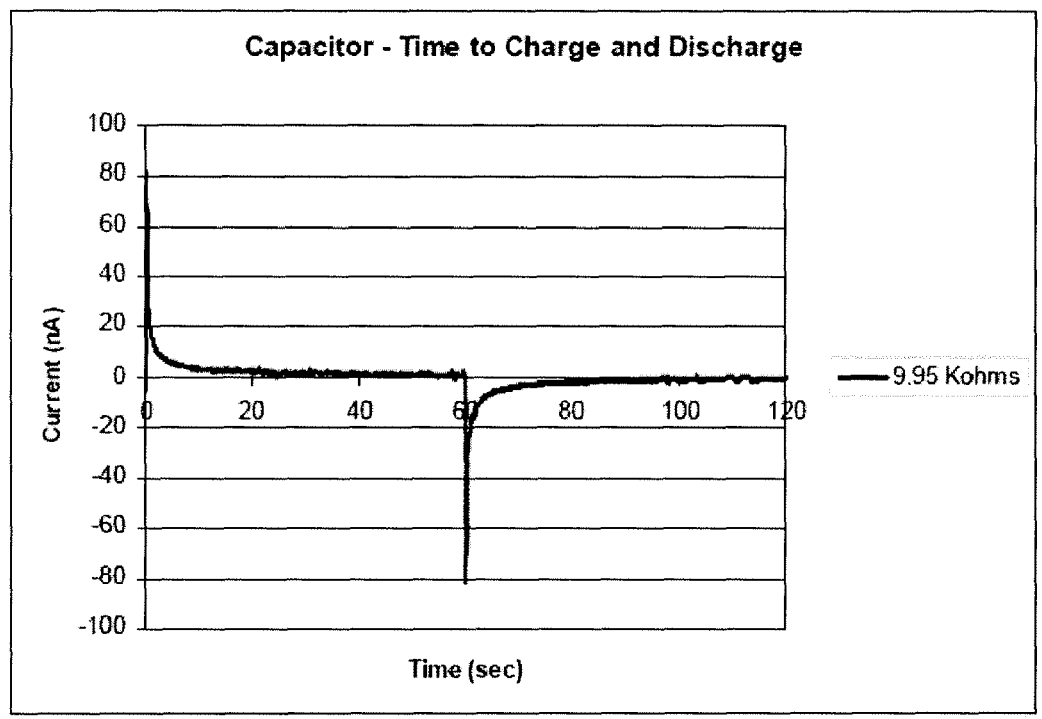
FIGS. 11A-11B show time to charge curves for a digitated capacitor according to experimental results for a sixty second charge period.
Figure 11B:
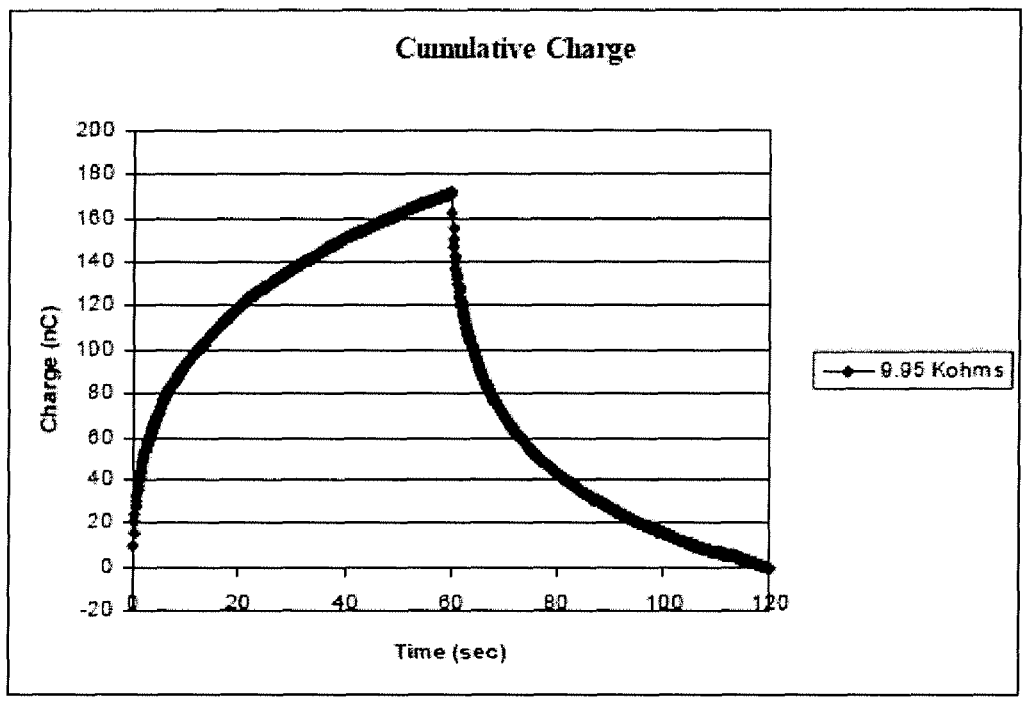

To confirm that the charge was accumulating during the applied voltage period, a curve that showed both charge and discharge indicates that a capacitor existed and reaffirms the capacitor value. FIGS. 11A and 11B show the same digitated capacitor for a sixty second charge period and a sixty second discharge period. Using FIG. 11B, the capacitor value was calculated to be 17.1 µF.

Figure 12A:
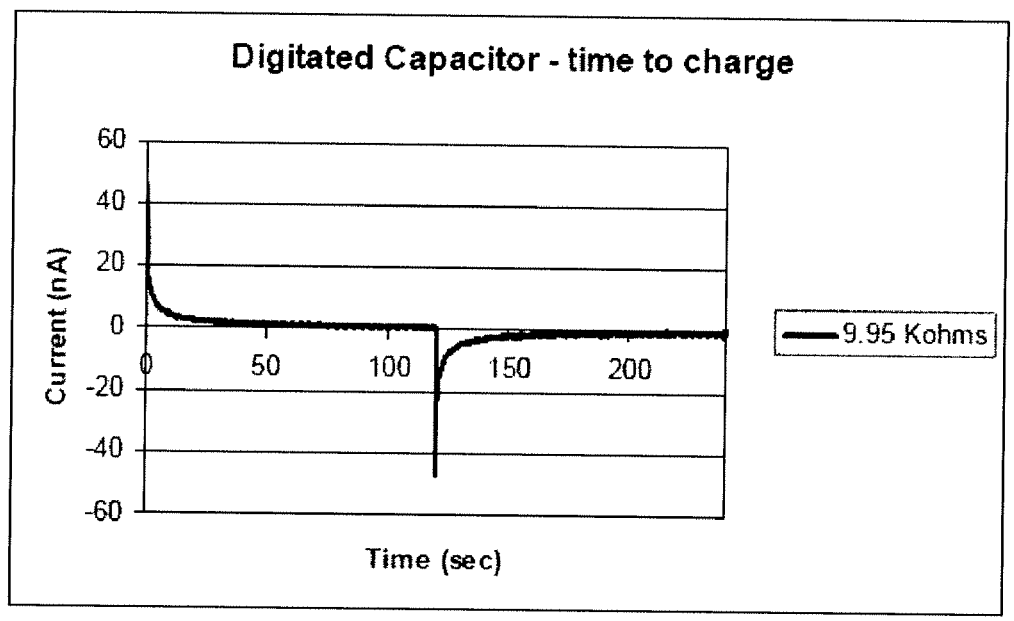
FIGS. 12A-12B show time to charge curves for a digitated capacitor according to experimental results for a four minute and ten minute charge period.
Figure 12B:
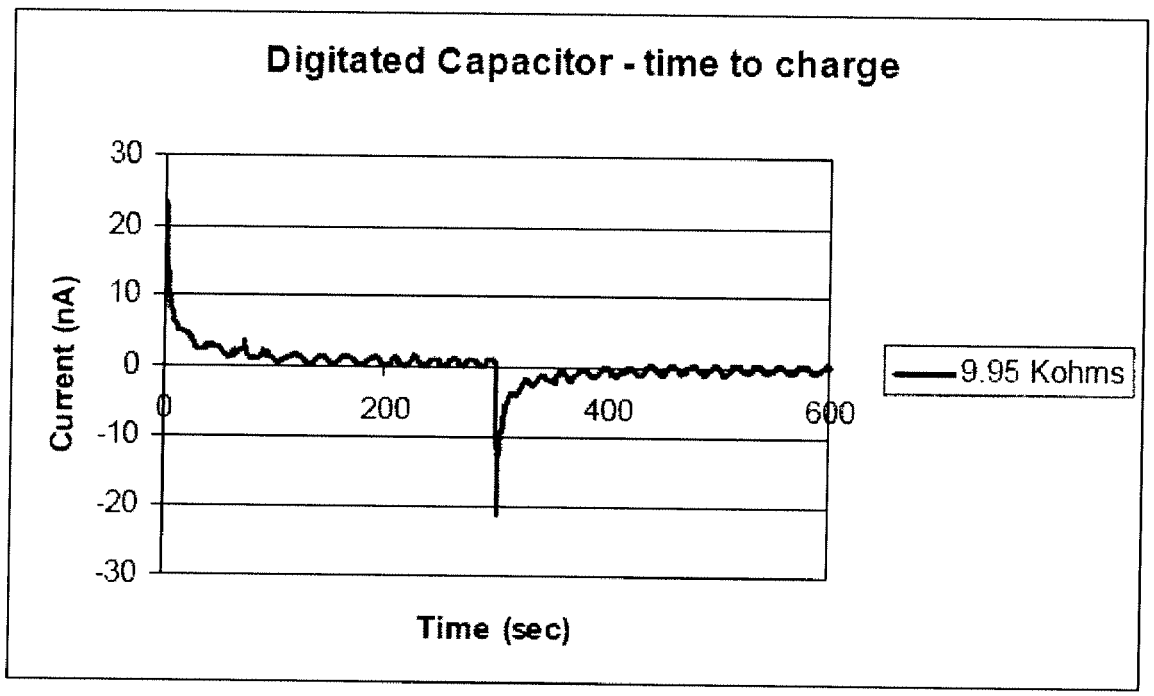

To demonstrate that the charge remains on the capacitor with voltage applied longer than 60 seconds, two longer charge and discharge cycles of 240 (4 minutes) and 600 seconds (10 minutes) were conducted, as shown in FIGS. 12A and 12B.

EXPERIMENT 4

Digitated Capacitor: Durability

Figure 13A:
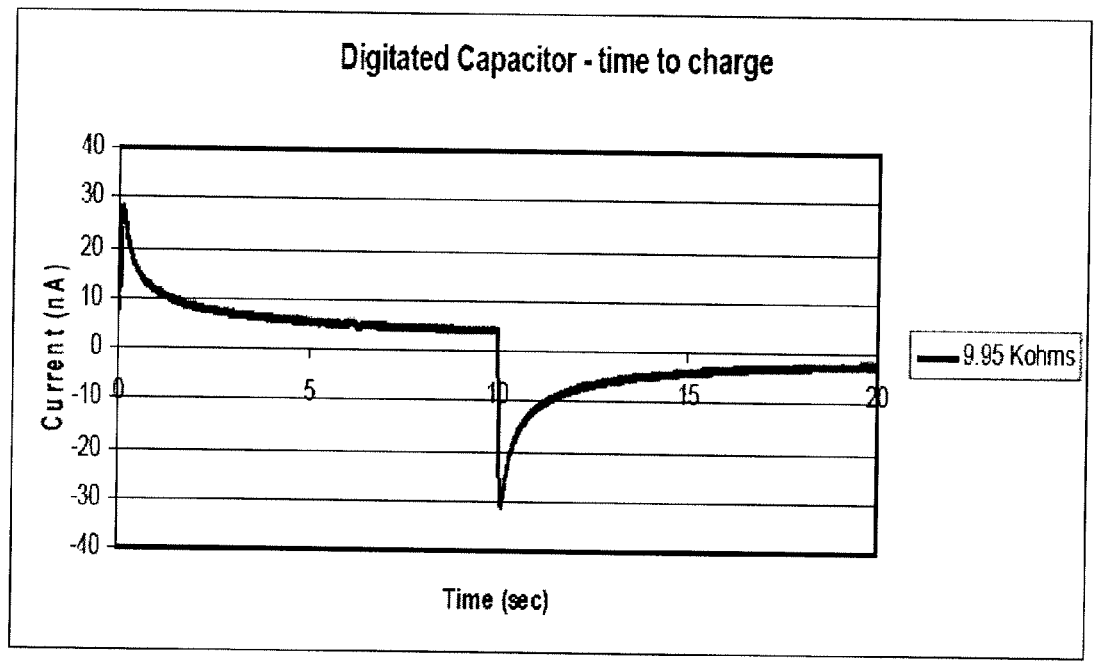
FIGS. 13A-13B show time to charge curves for an actual digitated capacitor according to experimental results for durability.
Figure 13B:
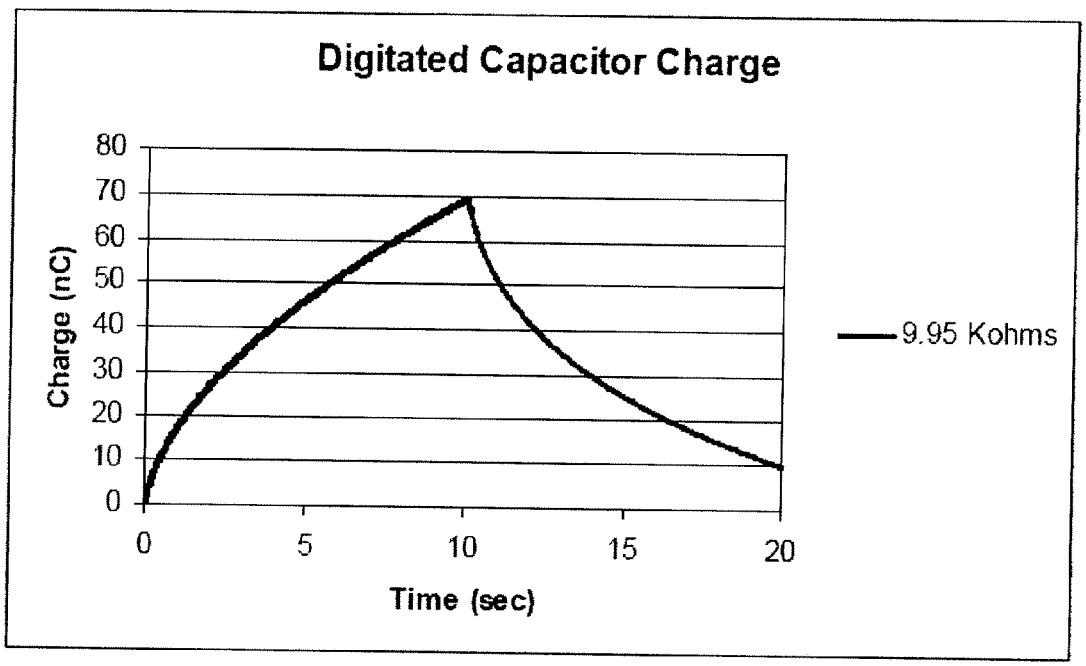

A PC digitated capacitor was tested again using different resistances for a period of 20 seconds. FIGS. 13A and 13B again show the capacitor when a 9.95 KΩ resistor is placed in series with it. The capacitance of 6.9 µF is somewhat lower than 19.3 µF in FIG. 10B. This is partly due to the less time it was allowed to charge, but also looking at the earlier charges for the capacitor the results are still lower. Importantly, the capacitor was able to hold a charge for several days, however, not without some degradation.

Figure 14:
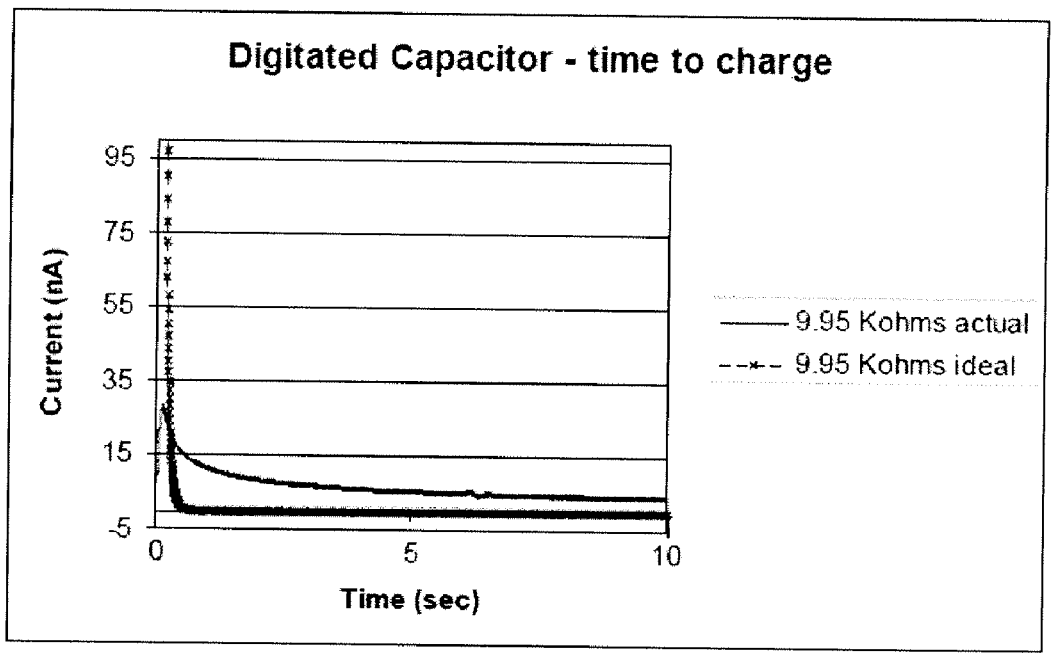
FIG. 14 shows a time to charge curve for an ideal digitated capacitor according to experimental results for durability.

One of the unexpected results besides the large capacitance is the shape of the curves. The shape seems to be initially an exponential component, typical of a capacitor, then a gradual, linear slope which is atypical. Using the resistor value of 9.95 KΩ and the capacitance value of 6.9 µF determined above, it is possible to compare the actual digitated capacitor curve with an ideal capacitor curve, as shown in FIG. 14. Clearly, the digitated capacitor of the present invention can have an atypical time-to-charge curve.

A number of features distinguish the digitated capacitor of the present invention. First of all, the time-to-discharge seen in the commercial capacitor is determined by its RC time constant, where R is the load resistance between the capacitor plates. In FIG. 14, the commercial capacitor is seen to be discharged in less than a second as the discharge curve is a pure exponential curve. In FIG. 14, the time-to-discharge is offset from the original exponential decay, as the discharge curve shows an inflection point where the temporal current deviates from the initial exponential decay and shows a nearly linear discharge. Perhaps charge on the planar plates explains the current discharge initially, while charge from the nanorods controls later.

Regardless, the digitated capacitor of FIG. 14 shows a region of persistent charge flow (well above a non-zero current flow) in which current flow continues far beyond the expected time-to-zero point.

Figure 15:
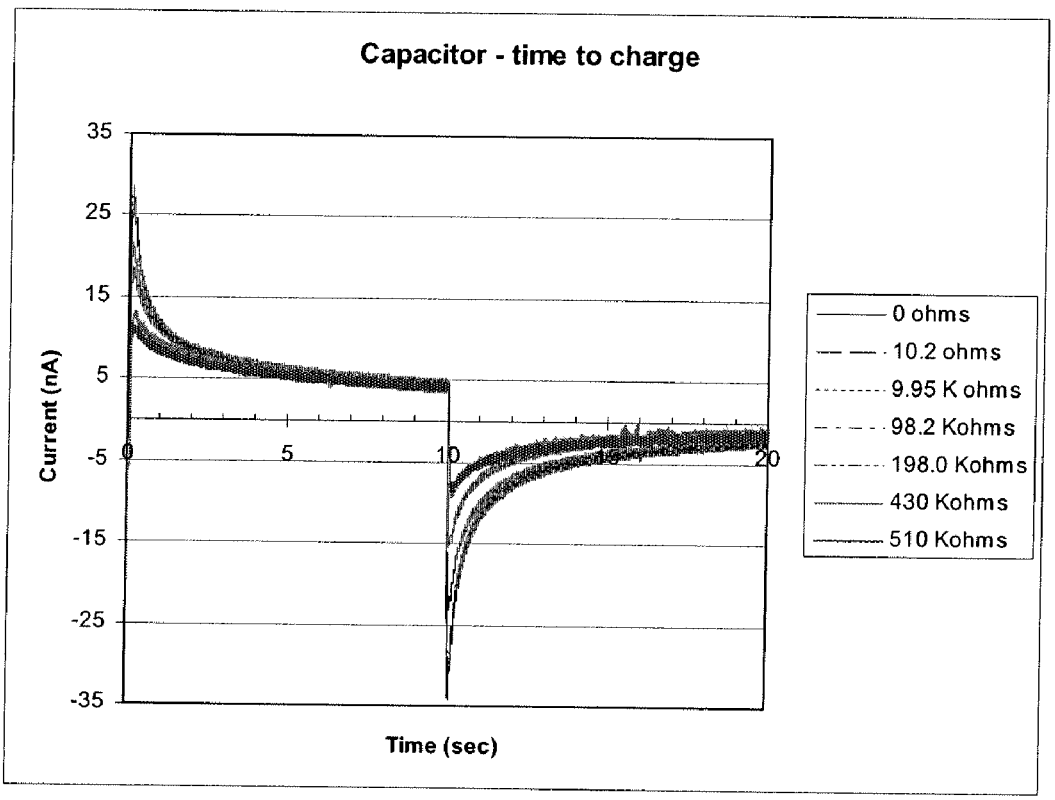
FIG. 15 shows a collection of curves for the capacitor connected in series to different resistances.

FIG. 15 shows a collection of curves for the capacitor connected in series to different resistances. The curves highlight two characteristics of the digitated capacitor. First, as discussed above, apparently two (or more) decay functions are involved. Initially, an exponential decay appears to occur, typical of resistor-capacitor series circuits. After this, the curve becomes more linear and very gradually approaches zero current.

The second unexpected result is that circuit loads with the smaller resistances have a longer time constant. Noting that the time-constant equals resistance times capacitance ($\tau = R \cdot C$), the 10.2Ω resistor circuit for example should have a much shorter time constant than the 510 KΩ resistor circuit. In fact, the lines should be crossing each other, which is not the case observed in the experiments.

AC Analysis

Another means of determining the value of the capacitance of an unknown capacitor device is to apply an AC signal and note the gain and phase response across the device. A series RC circuit results in a one-pole low pass filter. Using the equation of a voltage divider, the output voltage of the circuit would be:

$$V_{out} = V_{in} \cdot (1/Cs)/(R+1/Cs) \rightarrow V_{in}/(RCs+1)$$

where $s = j\omega$. Recalling that the −3 dB point of a sinusoidal signal is $1/\sqrt{2}$, the gain is:

$$|V_{out} = V_{in}| = |1/(RCs+1)| = 1/\sqrt{(RCs)^2 + 1^2}$$

From this it is possible to find the −3 dB point by setting R·C·s equal to 1. This results in the following equation:

$$\omega^2 R^2 C^2 = 1 \rightarrow C = 1/\sqrt{(R^2 \omega^2)}$$

Knowing that the radian frequency ω is simply 2πf, the capacitance can be solved by finding the cutoff (−3 dB) frequency. Additionally, the phase at this point can be found by again solving the equation:

$$V_{out} = 1/(RCs+1) \rightarrow V_{-3dB} = 1/(j1+1) \rightarrow -\tan(1/1) \rightarrow -45°$$

As a first experiment in AC testing, bare PC membranes were covered with silver print on both sides in order to determine their capacitance. The importance of this test is to correlate the three different testing methods to each other. The expectation is that results will not be exactly the same, but that certainly they will be within an order of magnitude of each other.

EXPERIMENT 5

Correlation of DVM (Multimeter), Potentiostat and Oscilloscope

Supplies and Equipment:
1. 2 PC membranes with silver print applied to both sides, containing 200 nm diameter pores, identified as Capacitor #1 and Capacitor #2.
2. One 100 pF commercial capacitor.
3. Scope DVM 638 Multitester.
4. Potentiostat/Galvanostat Model 273 E&G Princeton Applied Research.
5. HP 54603B Oscilloscope and HP 33120A Function Generator.
6. Silver print was placed on both sides of 2 different PC membrane structures, creating 2 parallel-plate capacitors.

The DVM directly measured the capacitance from probe wires, with the results displayed digitally. Using an RC series circuit (R=98.3 KΩ) to create a low pass filter, the oscilloscope in conjunction with the function generator can locate the −3 dB point as well as 45° angle to find the corner frequency and hence the capacitance value ($C = 1/(2 \cdot \pi \cdot f \cdot R)$).

Finally, the potentiostat measures the time-to-charge (with a 9.8 KΩ series resistor) from which cumulative charge can be derived to determine the capacitance value (4 V applied for 500 ms then 0 V applied for another 500 ms).

Figure 16A:
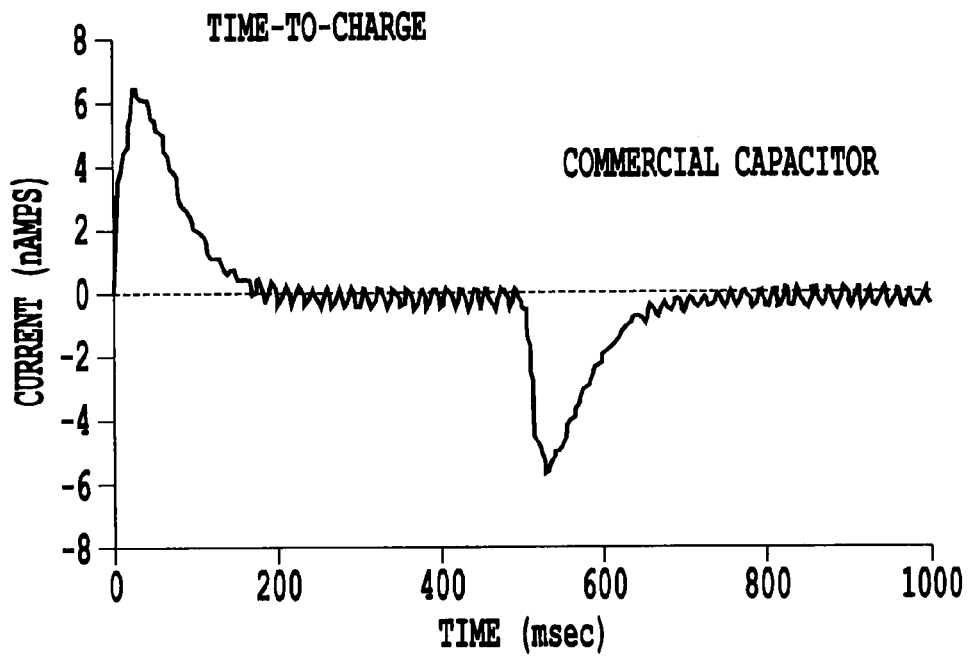
FIGS. 16-18 are graphs showing time to charge curves for a digitated capacitor according to experimental results for testing of correlation of a DVM (multimeter), Potentiostat, and Oscilloscope.
Figure 16B:
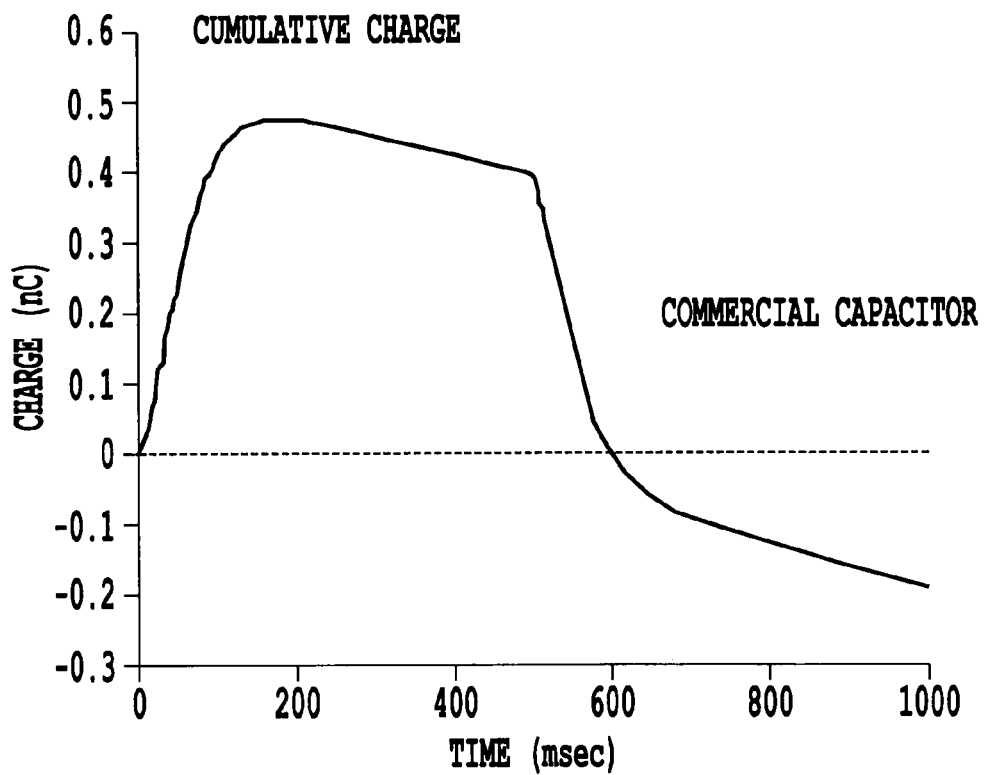
Figure 17A:
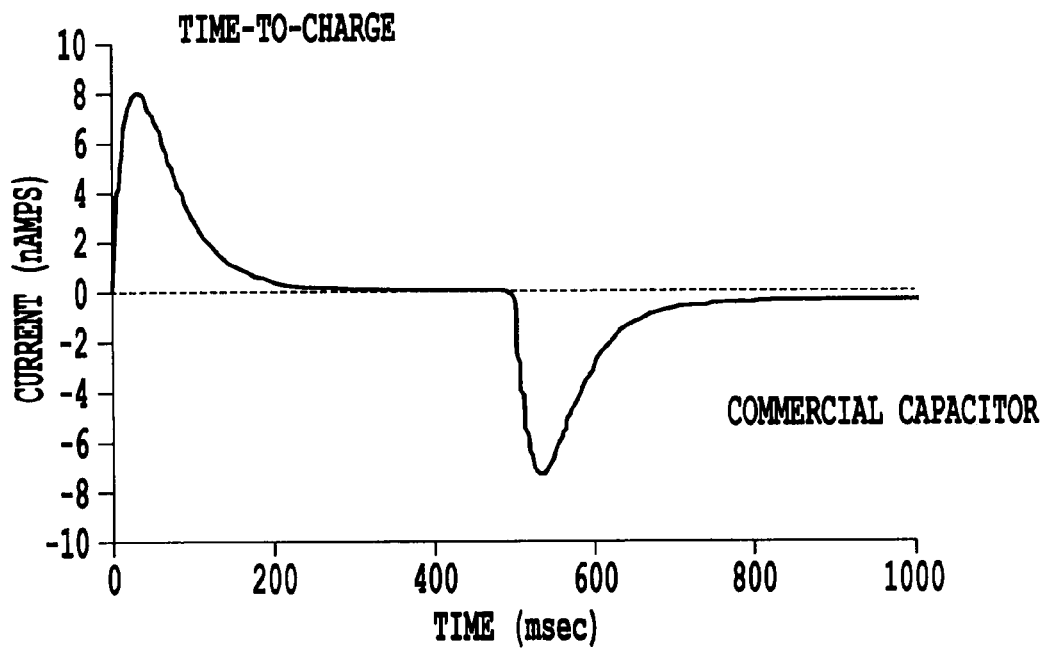
Figure 17B:
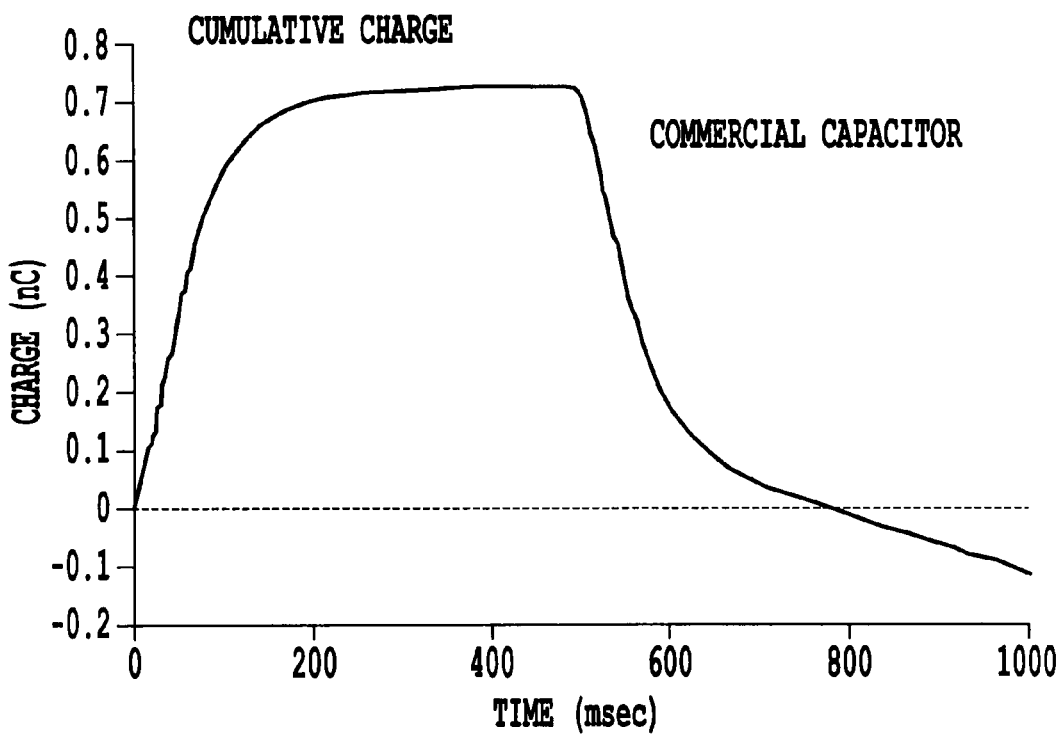
Figure 18A:
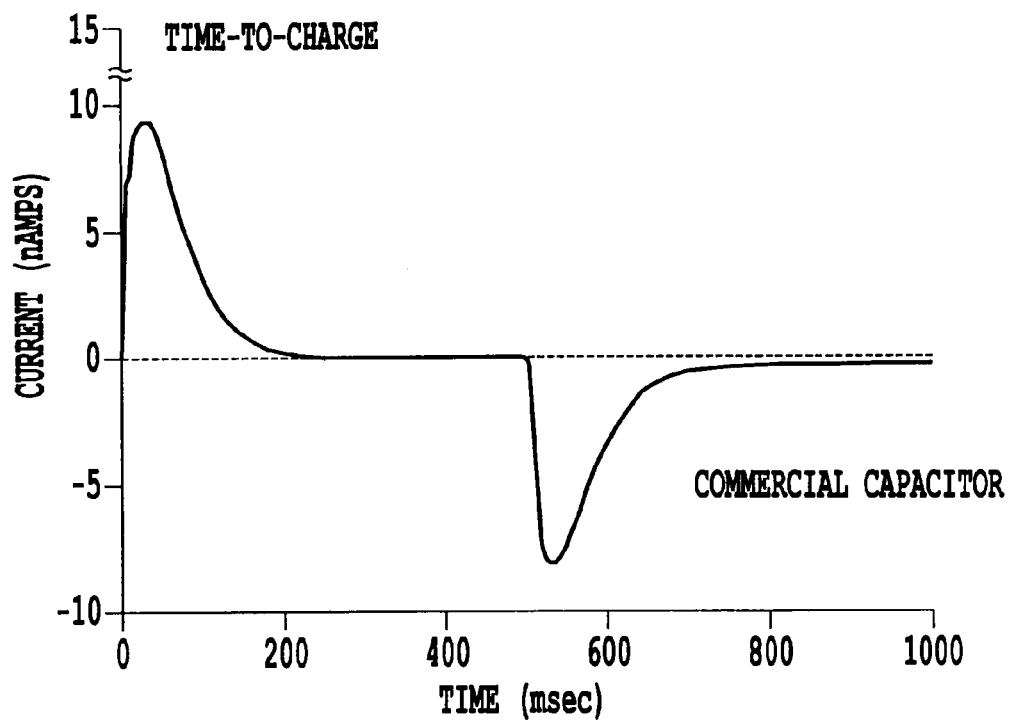
Figure 18B:
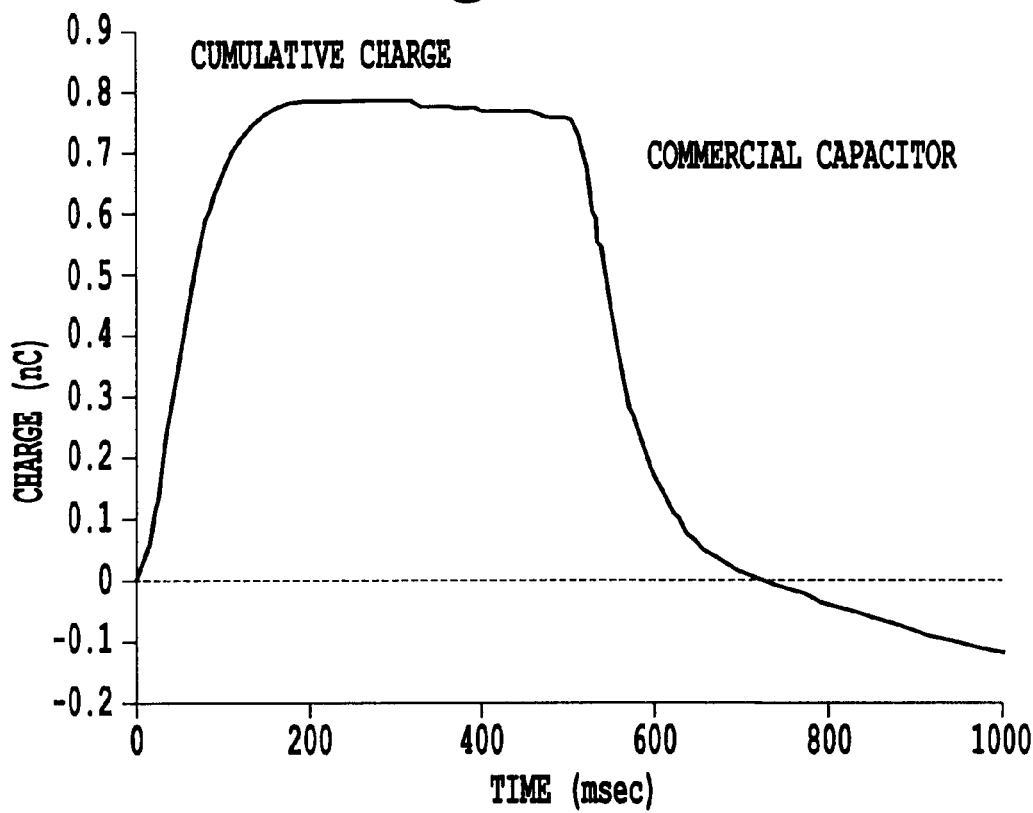

Results:

The results of the three different tests are shown in Table 9. The potentiostat data is from graphs shown in FIGS. 16-18 (it should be noted that due to calibration issues with the potentiostat, it is off by approximately 100 pA, the cumulative charge in some cases has a negative slope and ends with a negative value). The results are reasonably close to each other and certainly within an order of magnitude. The DVM multitester results are between the potentiostat and scope readings and are closest to the value of the commercial capacitor. The oscilloscope readings were somewhat harder to interpret due to the relatively large stepping size at the corner frequency. Importantly, the time-to-charge and Bode plots for the commercial and silver PC membranes both appear to have similar shapes, indicating that the technology for building silver electrodes is not affecting the shape of the curves seen in the digitated capacitor.

TABLE 9

Comparison of test equipment

| Parallel-Plate (Aug. 18, 2005 to Sep. 20, 2005) | DVM Mulitester | Potentiostat | Oscilloscope |
|---|---|---|---|
| Capacitor #1 | 140 pF | 181 pF | 129 pF |
| Capacitor #2 | 167 pF | 195 pF | 129 pF |
| Commercial (100 pF) | 106 pF | 119 pF | 112 pF |

Gain and phase response curves were measured and showed a cutoff frequency in all cases around 12 to 14 KHz.

EXPERIMENT 6

Aluminum Oxide Digitated Capacitor

Supplies and Equipment:
1. 2 Alumina membranes with 100 nm diameter pores, one used as a parallel-plate capacitor the other deposited with copper.
2. Scope DVM 638 Multitester.
3. Potentiostat/Galvanostat Model 273 E&G Princeton Applied Research.
4. HP 54603B Oscilloscope and HP 33120A Function Generator.
5. Silver print was placed on both sides of 1 alumina membrane with the idea that this would be a parallel-plate capacitor. The other alumina membrane was deposited with copper.

The DVM directly measured the capacitance on both membranes. Using an RC series circuit with the resistance equal to 198 KΩ, a frequency sweep was taken of the parallel-plate capacitor. The digitated capacitor used a 9.95 KΩ resistor. The parallel-plate capacitor was approximately 1 square centimeter, while the digitated capacitor was about one-third of a square centimeter.

Results:

The results are shown in Table 10. For the parallel-plate membrane, the capacitance was 90 pF and for the digitated alumina capacitor, it was 1206 pF (after adjusting for size). For these capacitors, a −3 dB cutoff frequency of about 3,500 Hz and a capacitance of 230 pF for a parallel-plate capacitor, while the digitated capacitor had a cutoff frequency of approximately 82,500 Hz corresponding to a capacitance of about 582 pF.

TABLE 10

Alumina membrane results

| Parallel-Plate (Aug. 18, 2005 to Sep. 20, 2005) | DVM Multitester (F/cm$^2$) | Oscilloscope |
|---|---|---|
| Parallel-plate | 90 pF | 230 pF |
| Digitated capacitor* | 1206 pF | 582 pF |

*Adjusted by a factor of 3 to compensate for smaller size

Capacitance Per Volume

While the above experimental results give a capacitance value per area for the digitated capacitor, the capacitance per volume (capacitance density) can also be calculated based on the calculation for the capacitance above. For example, in Table 6 above, for PET with 100 nm pores and 12 μm thickness, the capacitance was measured to be 71.9 pF. Therefore, the total capacitance per volume is measured to be 71.9 pF/0.0012 cm$^3$, which equals roughly 59 μF/cm$^3$. In Table 10 above the capacitance for alumina with 100 nm pores was measured at 582 pF, above, the membrane thickness is 60 μm (0.006 cm) with for an area of 1 cm$^2$ of the membrane. Therefore, with the total capacitance per volume is measured to be 582 pF/0.006 cm$^3$, which equals roughly 97 μF/cm$^3$. Additionally, from the above table 8B with a 20 minute deposition time for alumina, the capacitance was measured at 464 nF, which gives a capacitance per volume of roughly 77 μF/cm$^3$.

Notably, capacitance per unit volume increases with two parameters: pore density (M) per cm$^2$ in the membrane and dielectric coefficient (∈) of the membrane material. The pore diameter (d) in anodized membranes translates easily into pore density as follows:

$$M = \frac{0.44}{d^2}.$$

Accordingly, alumina (epsilon=9 to 9.8 and pore diameter 200 nm) corresponds to M=1.1·10$^9$/cm$^2$. Available membranes have pores of diameter d=20 nm, which gives the pore density M=0.1·10$^{11}$/cm$^2$. Such membranes are available from Whatman, Inc. (as noted above). Thus, building storage device using a membrane with pores of 10 nm diameter will increase the capacitance by a factor:

$$X = \frac{1.1 \cdot 10^{11}/cm^2}{1.1 \cdot 10^9/cm^2} = 100.$$

Further, as discussed above, it is possible to use titania membranes with the dielectric coefficient ∈=100 which would raise the capacitance by a factor 10 in comparison with alumina (∈=9 to ∈=9.8).

Therefore, it is evident that the capacitance per volume is variable based on the membrane, pore size, pore density, thickness used, and the deposition time. Indeed the values in alumina in the hundreds of mF/cm$^3$ are attainable by optimizing factors such as deposition time (resulting in longer rods), higher dielectric membranes, higher pore density, and electrodes extending over the membrane sidewalls. Accordingly, the capacitance per volume would extend into the tens to hundreds of F/cm³ if higher dielectric constant materials (such as titanium oxide or barium titanate) were used.

Interdigitated Energy Storage Devices (IESD):

An Interdigitated Energy Storage Device (IESD) includes features similar to a digitated capacitor discussed above. However, instead of including only rods that extend into a membrane from one metal plate, an IESD includes first rods that extend into the membrane from a first plate, and second rods that extend into the membrane from a second plate, with the membrane located between the plates.

Figure 19:
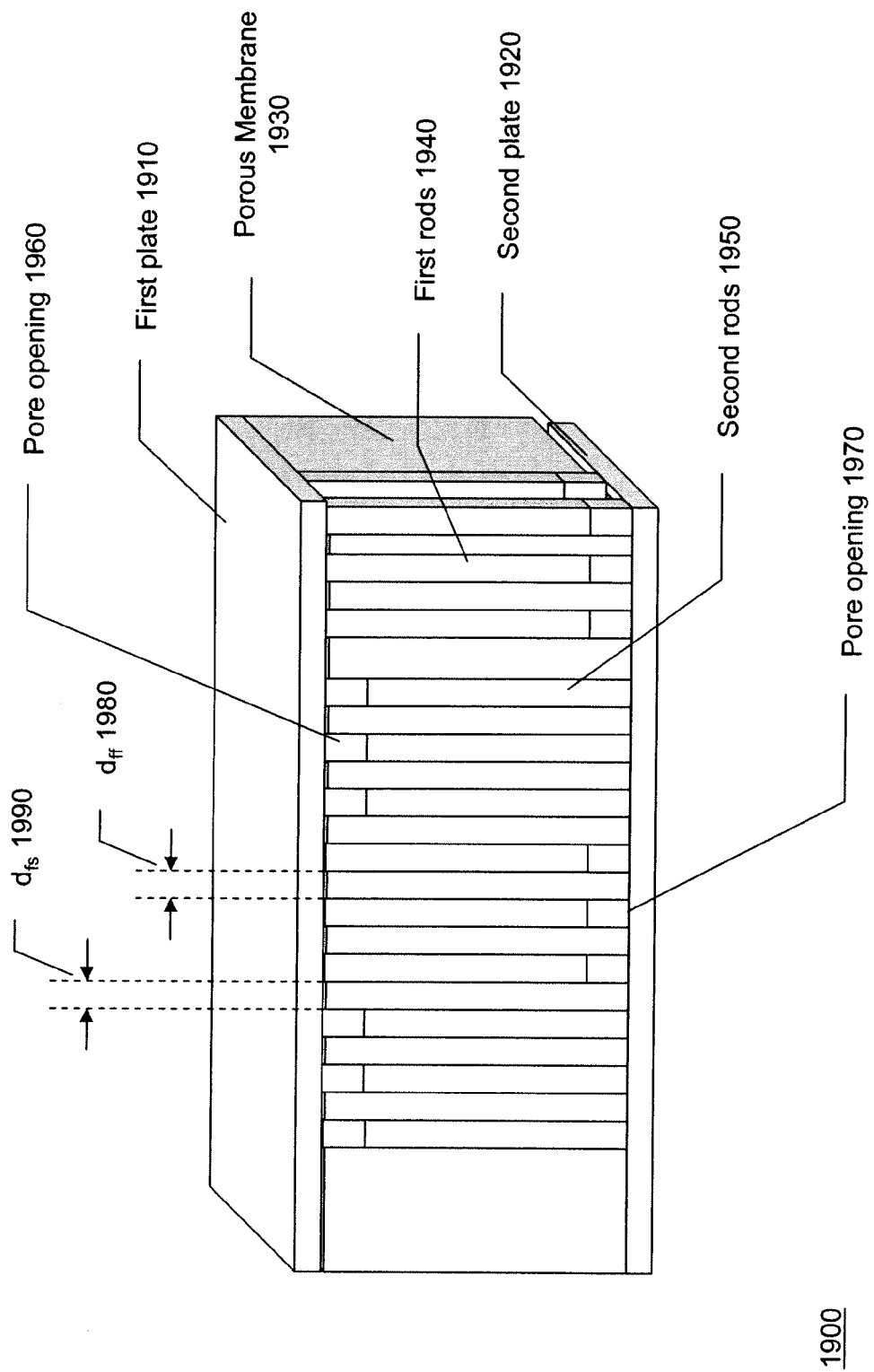
FIG. 19 is a perspective view of an interdigitated capacitor according to one embodiment of the present invention.

FIG. 19 is an isometric view of an example of an IESD 1900 according to an embodiment of the present invention. The IESD 1900 includes a first plate 1910, second plate 1920, and a porous membrane 1930 between the first plate 1910 and the second plate 1920. The porous membrane includes pores that extend completely from a first side of the membrane to a second side of the membrane. Further, the IESD 1900 includes first rods 1940 that are electrically connected to the first plate 1910 and extend through pores in the membrane 1930 towards the second plate 1920, without making electrical contact with the second plate 1920. The IESD 1900 also includes second rods that are electrically connected to the second plate 1920 and extend through pores in the membrane 1930 toward the first plate 1910. In this example, a first rod 1940 extends toward the second plate through pore opening 1970, and a second rod 1950 extends toward the first plate through pore opening 1960. Dimension $d_{ff}$ indicates a distance, measured in the direction of the plane of the first plate, between adjacent first rods 1940. Dimension $d_{fs}$ indicates a distance, measured in the direction of the plane of the first plate, between an adjacent first rod 1940 and second rod 1950. In one example $d_{ff}$ and $d_{fs}$ are about 0.1d, where d is the diameter of the each pore. In another example, $d_{ff}$ and $d_{fs}$ are about 0.5d. However, $d_{ff}$ and $d_{fs}$ are not limited to these values.

Examples of rods and membrane pores are illustrated in FIG. 19 as having oblong shapes for improved visual clarity. However, the actual shapes of the rods are not limited to oblong shapes. The rods may also be cylindrical, having a circular, oval, or elliptical cross section.

Figures 20A, 20B:
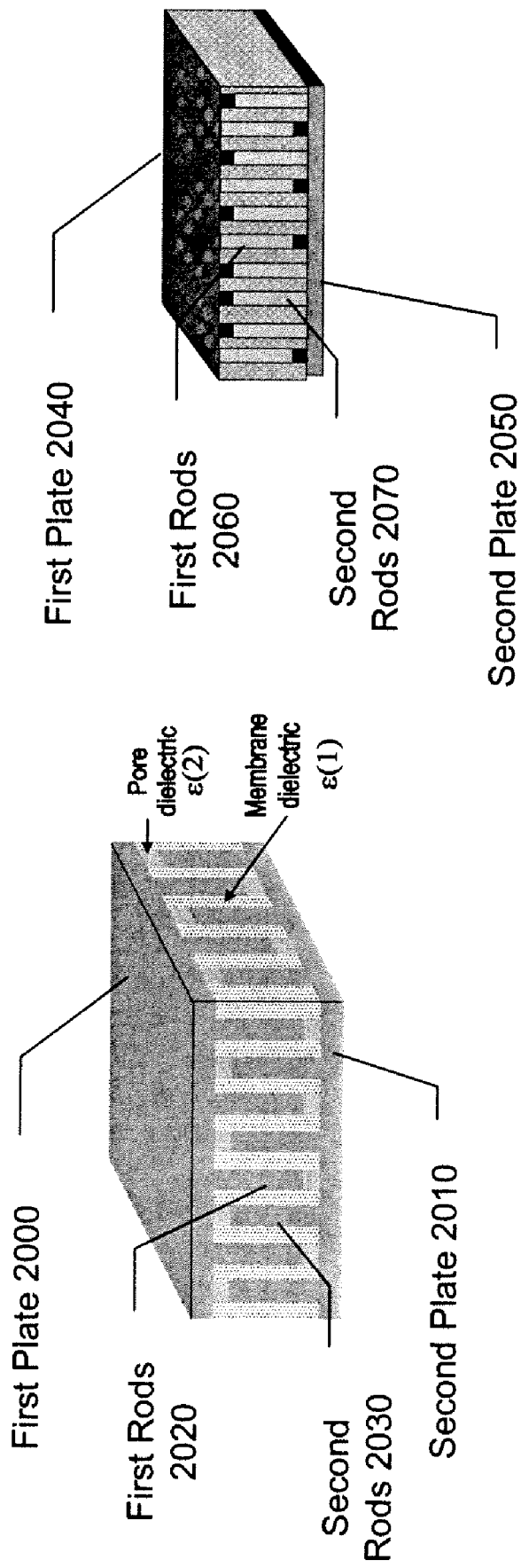
FIGS. 20A and 20B are isometric views of arrangements of rods in further embodiments of the present invention.

FIGS. 20A and 20B are detailed isometric views of arrangements of rods in further embodiments of the present invention.

FIG. 20A shows an embodiment of an IESD including a first plate 2000, second plate 2010, first rods 2020 that extend from the first plate 2000, and second rods 2030 that extend from the second plate 2010. In the IESD of this example, rods have a maximally interleaved arrangement, where each first rod 2020 is adjacent to a second rod 2030.

FIG. 20B shows an embodiment of an IESD including a first plate 2040, second plate 2050, first rods 2060 that extend from the first plate 2040, and second rods 2070 that extend from the second plate 2050. In the IESD of this example, rods have a group interleaved arrangement, where plural first rods 2060 are adjacent to one another and/or plural second rods 2070 are adjacent to one another.

Method of Making an Interdigitated Energy Storage Devices (IESD)

FIG. 21 is a flow diagram of a method of fabricating an IESD according to a further embodiment of the present invention. The IESD may be fabricated using a porous membrane with a high dielectric coefficient, as discussed above with regard to fabrication of the digitated capacitor. In addition, oxidation of aluminum ($\in_r$=10), titanium ($\in_r$=100), barium titanate ($\in_r$=2000-3000), and all the perovskite group materials can yield porous membranes suitable for fabrication of IESDs. The method described below is efficient and effective for interlacing two sides of a templated nanostructure. The mask can be arrayed in specific patterns and the resolution required can be controlled by the diameter size of the mask openings. A prototype device with metal nanorods IESD has already been successfully built in the laboratory using this process.

In a first side cathode forming step S100, cathodes are formed on a first side of the porous membrane. Each cathode includes a conductive metal and each cathode covers one or more of the pore openings on the first side of the porous membrane.

The cathodes may be formed using one or more of various possible methods, such as i) by printing the cathodes on the first side of the porous membrane using an inkjet printer and conductive ink, ii) forming a photomask using a light sensitive material such as photoresist, removing portions of the photoresist by exposing portions of the photomask to light in a photolithography process and depositing metal through the removed portions of the mask and onto the first side of the porous membrane, or iii) forming a template in a material that is not porous with respect to a conductive paint, forming holes through the template, placing the template over the first side of the porous membrane, and painting over the template so that the conductive paint passes through the holes and adheres to the first surface of the porous membrane to form the cathodes. The holes in the template may be formed using mechanical means (e.g., punching or drilling holes, or creating holes by high energy beams) or the template material itself may be created to include suitable holes, for example, by growing a polymer template membrane including holes through which conductive paint may pass, or for example, as described in Vetter, J and R. Spohr, "Application of ion track membranes for preparation of metallic microstructures," *Nucl. Instrum. Methods Phys. Res., Sect. B.*, 79, 691-694. Other metal deposition processes, for example those known to one of skill in the art of microcircuit fabrication, may alternatively be used to form the cathodes in step S100, or the cathodes may be formed by a Physical or Chemical Vapor Deposition.

The conductive material included in the cathode may include a conductive metal such as may be found in silver print, PVD, or a conducting polymer.

In a first side cathode connection step S200, the cathodes are electrically connected to a power supply configured to output a controlled voltage using a removable conductor. The removable conductor is an electrical conductor that is attached to the power supply and is capable of being attached to the cathodes temporarily, and then removed in a subsequent step without damage to the cathodes or the membrane. In this step, the removable conductor may include a conductive tape (e.g., copper tape) connected to the power supply, or may include a conductor temporarily pressed in against the cathodes.

In a first side electrodeposition step S300, small rods are deposited into the holes in the pores that are covered by the cathodes. The material forming the rods is first deposited on the side of the cathodes in contact with the porous membrane, and in the regions exposed by the pores under the cathodes. The conducting material is electrodeposited into the pores using previously established methods, for example, as described by Lee, J. et al., "Electrodeposition in Nanostructure Templates Using Novel Cathode Preparation," *Electrochemical Transaction*, Vol. 1(12), 25, or Lee, J. et al., "Electrical Characterization of nano Structured Energy Storage Device," *Electrochemical Transaction*, Vol. 2, in printing.

In the first side electrodeposition step S300, the length of the formed rods is controlled. For example, the length of the rods may be controlled so that the rods do not extend beyond a second surface of the porous membrane, which is opposite to the first surface of the porous membrane. The length of the rods may be controlled by controlling one or more of an environment (e.g., temperature or pressure), a composition (e.g., a chemical concentration used in the electrodeposition), a cathode voltage, or a duration of electrodeposition, or by controlling other factors.

In this first side electrodeposition step S300, the second side of the porous membrane extends into an electrodeposition fluid, while the first side of the porous membrane and the cathodes are kept separate from the electrodeposition fluid.

In a first cathode disconnection step S400, the removable conductor is removed from the first side cathodes. Preferably, the removable conductor is removed without damaging the cathodes, the porous membrane, or the rods.

In a second side cathode forming step S500, at least a portion of a second side of the porous membrane (opposite to the first side) is covered with a conductor to form a second side cathode. The second side cathode may cover some or all of the second side of the porous membrane, and it is not necessary to deposit the cathode conductor using a mask or template as done in the first side cathode forming step S100. Thus, the conductor of the second side cathode may include a conductive metal such as may be found in silver print, PVD, or a conducting polymer, and the conductive metal may be deposited on the second side of the porous membrane using any of the methods described above with respect to the first side cathode forming step S100, but without requiring a template or mask to control the area of porous membrane to which the conductor is applied.

In a second side cathode connection step S600, the second side cathodes are electrically connected to a power supply. The connection may be made using a removable or non-removable conductor. Any of the removable conductor attachment methods described with respect to the first side cathode connection step S200 may be used in the present step, without limitation or dependence on the method used in step S200. In addition, the electrical connection may be made using a non-removable conductor, such as a conductor that is soldered or welded to the second side cathode.

In a second side electrodeposition step S700, the first side of the porous membrane, including the first side cathodes, is placed in an electrodeposition fluid, while the second side of the porous membrane is kept removed from the electrodeposition fluid, and second rods are deposited into pores having openings on the first side of the porous membrane that are not already covered by the first side cathodes. The metal forming the second rods is first deposited on a portion of the second cathodes facing the second side of the porous membrane and covering the pores on the first side of the porous membrane that are not already covered by the first side cathodes.

In a second side cathode disconnection step S800, the removable conductor is removed from the second side cathode, if a removable conductor was used in step S600. Preferably, the removable conductor is removed without damaging the cathodes, the porous membrane, or the rods.

Further, although the first side cathodes are in contact with the electrodeposition fluid, the first side cathodes are not electrically connected to the power supply, and therefore, advantageously, additional metal is not deposited on the first side cathodes or the first rods during the second side electrodeposition step S700. Further, the first cathodes mechanically block the electrodeposition fluid from entering pores they cover, and consequently also block deposition in those pores.

Thus, the cathodes and previously deposited material blocks deposition from the opposite side of the structure, thereby allowing the device to be formed while using a mask or template to form only the cathodes on one side of the porous membrane. Advantages of this technique include the simplicity of the process by using only one mask or template, the ability to develop complicated interlaced patterns in the templated nanostructure (i.e., the arrangement of the first and second rods) including interdigitated structures, and low sensitivity to contaminants. The advantage of low sensitivity to contamination is the fact that because of this low sensitivity to contamination the fabrication does not require clean room facilities and this is one of the significant factors influencing cost.

According to another embodiment of the invention, an IESD may be fabricated as described above, and the first side cathode forming step S100 may further include a mask preparation step S110 that includes forming a mask from paper, such as a paper separator provided with commercially available Whatman Track-Etch membranes (e.g., Whatman, Nuclepore Track-Etch, 25 mm diameter membranes with thickness of approximately 12 microns and diameter sized pores of 200 nm). The present embodiment also includes forming holes in the mask using a pushpin with the diameter size of about 1 mm.

According to another embodiment of the invention, a capacitor may be formed when a first permanent electrode is electrically connected to the first side cathodes, a second permanent electrode is electrically connected to the second side cathodes, and the first membrane, the first permanent electrode, and the second permanent electrode are placed in environmentally protective package, such as a plastic or ceramic surface mount package, or a plastic or metal leaded package.

According to another embodiment of the invention, plural IESDs may be electrically connected in series and/or in parallel to one another to vary the electrical characteristics of the resulting conglomerate (e.g., to increase the total capacitance).

FIGS. 22A-22I show stages of an example IESD fabricated according to the "one-mask" process embodiment shown in FIG. 21.

Figure 22A:
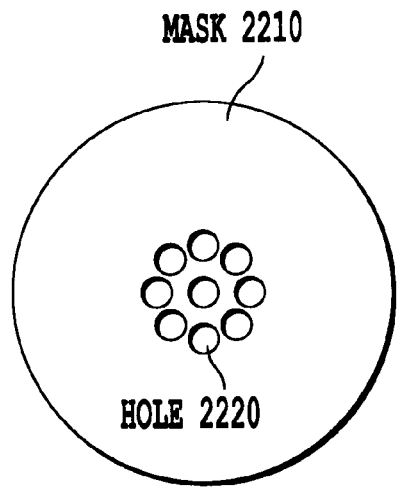
FIGS. 22A-22I are schematic depictions of various stages of an example interdigitated energy storage device IESD fabricated according to one process embodiment of the present invention.

FIG. 22A shows an example of a mask 2210 made from paper separators that are provided with commercially available Whatman Track-Etch membranes (Whatman, Nuclepore Track-Etch, 25 mm diameter membranes with thickness of approximately 12 microns and diameter sized pores of 200 nm). The pattern of holes 2220 in the mask 2210 is created using a pointed metal rod (not shown) with a diameter of about 1 mm.

Figure 22B:
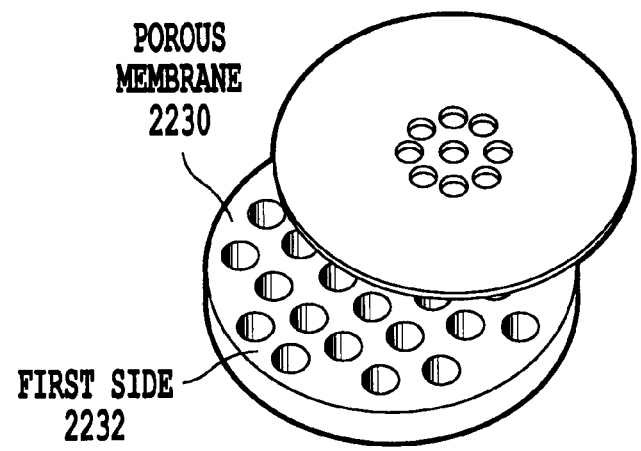

FIG. 22B shows an example in which the mask 2210 is placed in contact with a first side of a porous membrane 2230.

Figure 22C:
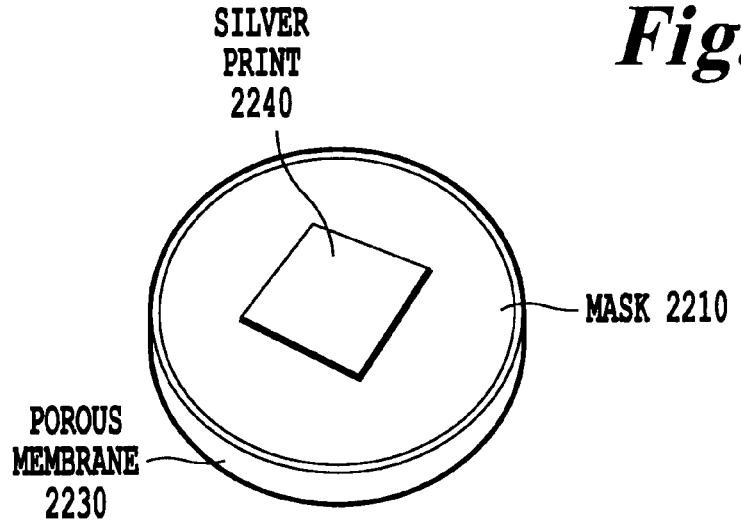

FIG. 22C shows an example in which silver print 2240 is coated on top of the mask 2210 so that the silver print 2240 goes through the holes 2220, and the silver print is allowed to dry. The silver print 2240 is able to fill the holes 2220 in the mask 2210 and creates the individual pore cathodes 2270 that form the cathode pattern on the first side of the porous membrane 2230. Unfilled pores 2260 in the membrane 2230 were not covered by openings in the mask 2210 and therefore are not covered by silver print 2240 or a resulting cathode 2270.

Figure 22F:
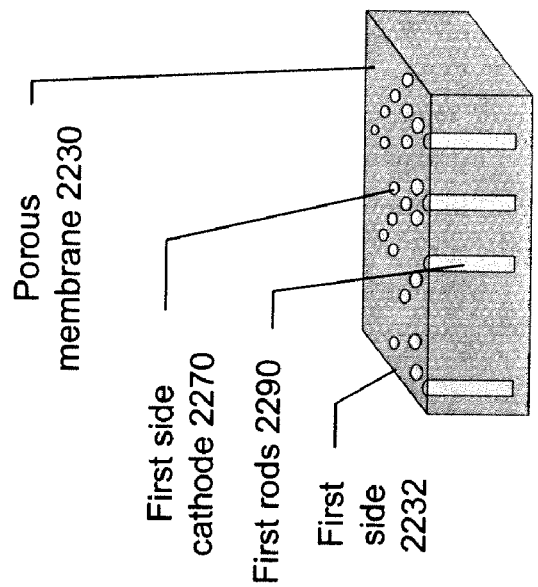
Figure 22E:
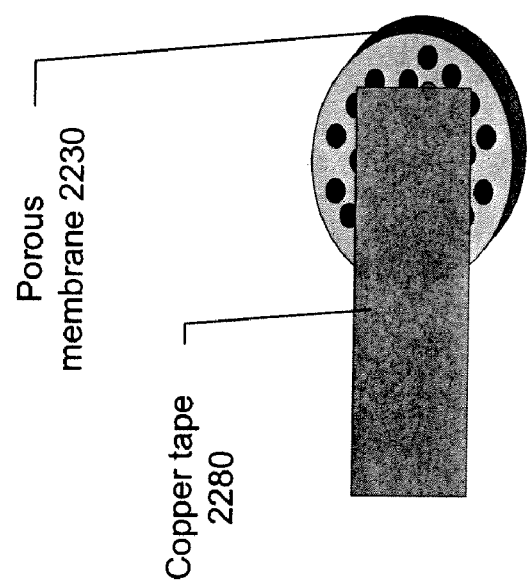
Figure 22D:
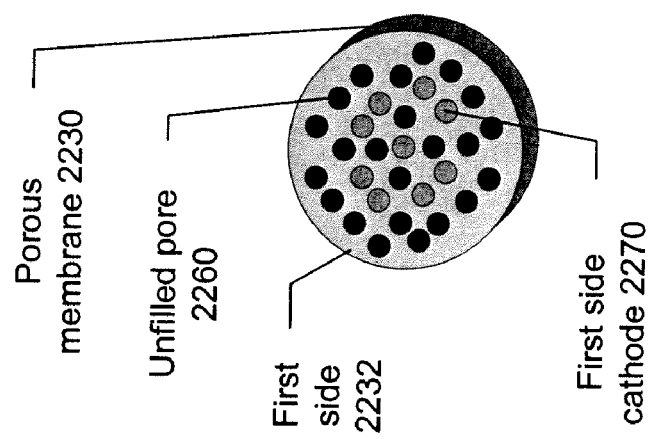

FIG. 22D shows an example of the resulting pattern of cathodes 2270 on the first side of the porous membrane 2230.

FIG. 22E shows an example of the first side cathodes electrically connected to a power supply (not shown) by copper tape 2280, which is placed on top of the first side cathodes and held in place by physical pressure. Various means of applying pressure are not shown, but may include a clamp, adhesive, or other methods known to those of skill in the related arts.

FIG. 22F shows an example of the porous membrane 2230 after electrodeposition fills the patterned pores with metal (e.g., copper) to form first rods 2290. The electrodeposition is halted before over plating (i.e., deposition of more metal than a pore can hold) occurs.

Figure 22I:
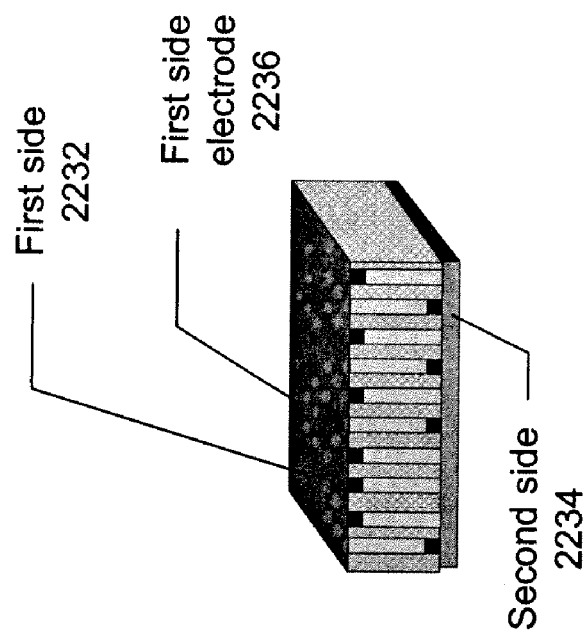
Figure 22H:
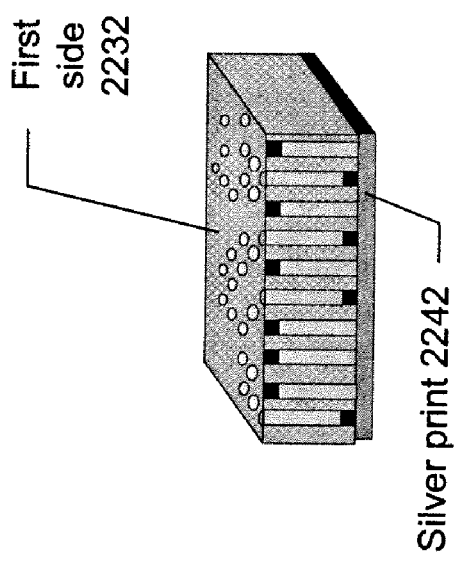
Figure 22G:
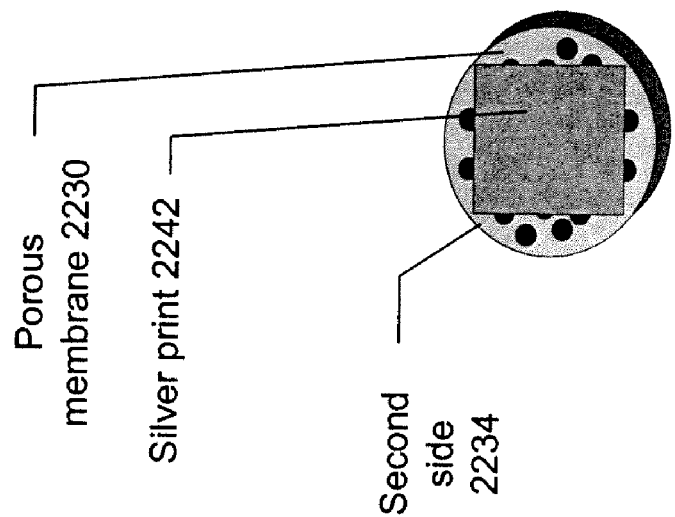

FIG. 22G shows an example of the second side 2234 of the porous membrane 2230 after removing the membrane from the electrodeposition apparatus, removing the copper tape, and applying silver print 2242 to a portion of the second side 2234 of the porous membrane 2230.

In FIG. 22H, a conductor (e.g., copper tape, not shown) is placed in contact with the silver print 2242 on the second side 2234 and electrodeposition takes place on the second side 2234 of the porous membrane 2230. The pores filled in the previous steps block deposition into the already filled pores.

FIG. 22I shows an example of the IESD having pores filled from both the first side 2232 and second side 2234 of the porous membrane. In this example, a conductive first side electrode 2236 is placed on top of the first side 2232 to electrically connect the first cathodes to each other (not shown).

According to another embodiment of the invention, in a porous membrane made from a material such as a durable membrane, a PC membrane, or a PET membrane, holes or pores may be created by a double ion bombardment process. FIGS. 23A-23I show an example of an IESD fabrication processing using double ion bombardment to form two sets of pores.

FIG. 23A shows side and top views of a PET membrane 2310 after performing heavy ion bombardment to form first pores 2320 in the PET membrane.

FIG. 23B shows a side view of the PET membrane 2310 after covering the membrane with a covering layer 2340 (i.e., a thin layer of mask material).

FIG. 23C shows side and top views of the PET membrane 2310 after performing further heavy ion bombardment, to create second pores 2330. When creating the second pores 2330, the ion beam is shifted with respect to the position of the first pores 2320 so that the second pores 2330 do not intersect the first pores 2320. The second pores 2330 extend through the covering layer 2340, and the first pores 2320 do not extend through the covering layer 2340.

FIG. 23D shows a side view of the PET membrane 2310 after electroplating a bottom metal layer 2350 on a bottom side of the membrane.

FIG. 23E shows a side view of the PET membrane 2310 after electrodeposition forms bottom deposited metal 2360 (i.e., nano-wires) in the second pores 2330 that communicate with the bottom metal layer 2350. Metal is not deposited in the first pores 2320, which are covered by the covering layer 2340.

FIG. 23F shows a side view of the PET membrane 2310 after removing the covering layer 2340 applied in FIG. 23B and the bottom metal layer 2350 electroplated in FIG. 23D.

FIG. 23G shows a side view of the PET membrane 2310 after electroplating a top metal layer 2380 on the top of the membrane.

FIG. 23H shows a side view of the PET membrane 2310 after deposition of nano-wires in the first pores 2320 that communicate with the top metal layer.

FIG. 23I shows a side view of the PET membrane 2310 after electroplating an electrode metal layer 2390 on the bottom side of the membrane.

Alternative Embodiments

1) There is an alternative embodiment in which the first side cathode connection step S200 is replaced with a permanent cathode connecting step that permanently connects the cathodes together, without blocking the porous membrane holes not attached to cathodes, thereby reducing the risk of damage.

2) There is another alternative embodiment in which an arrangement of the first or second cathodes is controlled to thereby control an amount of rod interleave, or to control various interdigitated structures.

3) Instead of electrodepositing the rods, they can be made from other materials, like semi-conductors or polymers.

IESD Results

An advantage of the IESD over a digitated capacitor may result from the entire rod being much closer to charges on the opposite structure. As a first approximation using the formula for a cylindrical capacitor and assuming the distance from the center of a pore to the edge of the next pore is 1 µm, the capacitance of an IESD is predicted to be approximately 44.4 nF.

Interdigitated Capacitor Manufacture:

The interdigitated capacitor involves alternating metal rods which makes it more complicated to manufacture. Ideally, a mask would be used that allows for interdigitation to occur between each rod. In practice, a mask was developed that allowed for many pores to be filled.

Using polycarbonate paper membrane separators, it was possible to punch millimeter diameter size holes into the paper. Placing the paper separators on top of the membrane, silver print was applied to the membrane with the result that conducting material (i.e., a cathode) was left on top of the PC membrane.

In the experimental environment, an advantage of using silver print instead of PVD was realized when building the crude interdigitated capacitor. Advantageously, only one mask was utilized, since the rods filled from one side block deposition into the pores on the opposite side. The filled pores act as a mask for the opposite side of the membrane.

Interdigitated Capacitor Experiments:

Two separate experiments were carried out involving similar processes. However, one experiment used nickel print and the other used silver print as the cathode.

Supplies and Equipment:
1. Polycarbonate 200 nm membrane
2. Nickel or silver print
3. Pushpin, pin is 1 mm diameter
4. Potentiostat, Ag/AgCl reference, carbon anode
5. Teflon beaker, modified with 1 cm hole in side for electrolyte deposition
6. Copper Sulfate, 0.5 M
7. Gold seals, 2 inch (Avery Notarial Labels, 2" diameter)
8. Capacitance measuring device, SCOPE DVM 638 Multi-tester Process:

a) The gold seal was pulled away from its backing and the paper used to separate the membranes from each other was used as a mask and placed on the side with glue (opposite side to the metallic gold side) of the seal, offset by about 1 cm from the center.

b) Six holes were made through the mask and seal, with a 1 mm diameter pushpin in a circular fashion close to the circumference of the modified beaker hole.

c) The membrane was placed on top of the paper and nickel or silver print was then painted on the gold side of the seal, filling the holes made by the pushpins.

d) After the nickel or silver dried, the membrane was attached to the beaker, with the gold metallic side facing outward and the sticky side acting as glue for the seal to attach to the beaker.

e) Copper tape contacted the nickel (or silver) print and conductivity was tested between the tape and the copper sulfate electrolyte to verify conductivity. The resistance was about 90Ω.

f) Electrodeposition took place at −500 mV.

g) After deposition, the seal and membrane were carefully removed from the beaker.

h) The membrane was turned over and the above steps were repeated, except that due to space issues, only two holes existed in the center of the membrane.

Results:

The results are provided in Table A.1. As can be seen, there is a much higher capacitance for the interdigitated capacitors (experiments #2 and #3) than for the parallel-plate capacitor (#1). Differences in the results of the two interdigitated capacitors (#2 and #3) may have been caused in experiment #3 having copper deposited for 2 minutes as well as using silver as the electrode compared to nickel, as used in #2. The important point is that even a simple interdigitated capacitor results in a significantly larger capacitance compared to the parallel-plate capacitor.

TABLE A.1

Interdigitated capacitance measurements

| Exp # Date | Membrane | Pore (Diameter/Thickness) | Deposit | Capacitance (/cm$^2$) |
|---|---|---|---|---|
| 1 Feb. 1, 2005 | PC | 200 mn/10 μm | No Deposit | 22 pF |
| 2 Feb. 1, 2005 | PC | 200 nm/10 μm | Nickel electrode 30 sec deposit | 90 pF to 300 pF |
| 3 Feb. 18, 2005 | PC | 200 nm/10 μm | Silver electrode 2 min deposit | 4 μm to 6 μm Very stable |

Vertical Integration of Structures

Another embodiment of the present invention includes packaging together plural electronic storage devices (e.g., plural DESD and/or IESD structures as described above). In particular, plural electronic storage devices may be electrically connected in a vertical arrangement with series and/or parallel electrical connections between the conducting elements of the devices. Vertical integration yields increased surface area of metal(conductor)/dielectric interfaces. Further, by arranging conducting elements against one another in a vertical arrangement, the conducting elements provide improved thermal conductivity and thereby increase the effective transverse thermal conductivity of the storage devices. This advantageously results in reduced thermal resistance of heat transfer and reduces the temperature gradient, which results in lower thermally induced stresses, and corresponding increases in reliability, durability and operational lifetime of the devices. In addition, vertical integration and precise deposition with the efficient use of materials permits optimization of energy density per volume or energy density per weight, which may be important performance metrics in many applications (e.g., portable applications).

Figure 24:
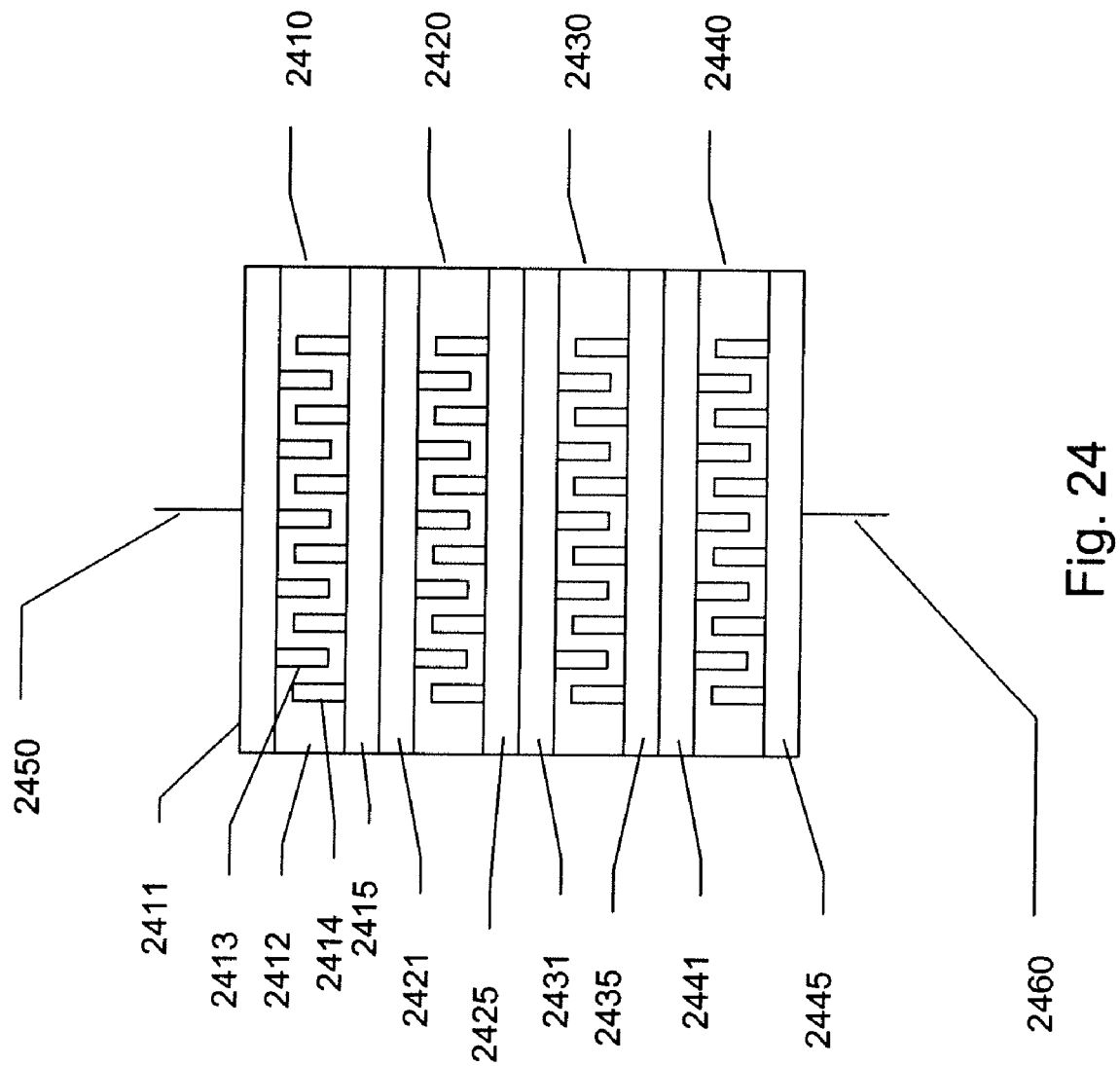
FIG. 24 depicts a vertically integrated charge storage device according to one embodiment of the present invention.

FIG. 24 is a block diagram of an embodiment of the present invention that includes a vertical arrangement of IESDs 2410, 2420, 2430, and 2440. Each IESD includes features similar to those described above. For example, IESD 2410 includes a porous membrane 2412 with first conductive rods 2413 extending from a first conductive element 2411 and second conductive rods 2414 extending from a second conductive element 2415. The conductive elements of each IESD is connected to at least one other IESD conductive element. Top and bottom IESDs are connected to outer electrodes, and the entire arrangement may be used as a charge storage device using the outer electrodes. Thus, outer electrode 2450 is connected to the first conductive element 2411, the second conductive element 2415 is connected to the first conductive element 2421, the second conductive element 2425 is connected to the first conductive element 2431, the second conductive element 2435 is connected to the first conductive element 2441, and the second conductive element 2445 is connected to outer electrode 2460. Connections between adjacent conductive elements or between conductive elements and the outer electrodes may include any conventional electrical connection technique known to those in the field. For example, the connection may be made by holding the elements together (e.g., using a mechanical holding structure or bracket, not shown, or using an adhesive, not shown), or by using an electrically conductive adhering material (e.g., solder or conductive adhesive).

In addition, an embodiment of the invention includes vertical integration of the storage elements (e.g., IESDs and/or DESDs) using the method of constructing a capacitor stack as described in U.S. Pat. No. 6,571,126 to O'Phelan et al., which is incorporated herein by reference in its entirety.

Figure 25:
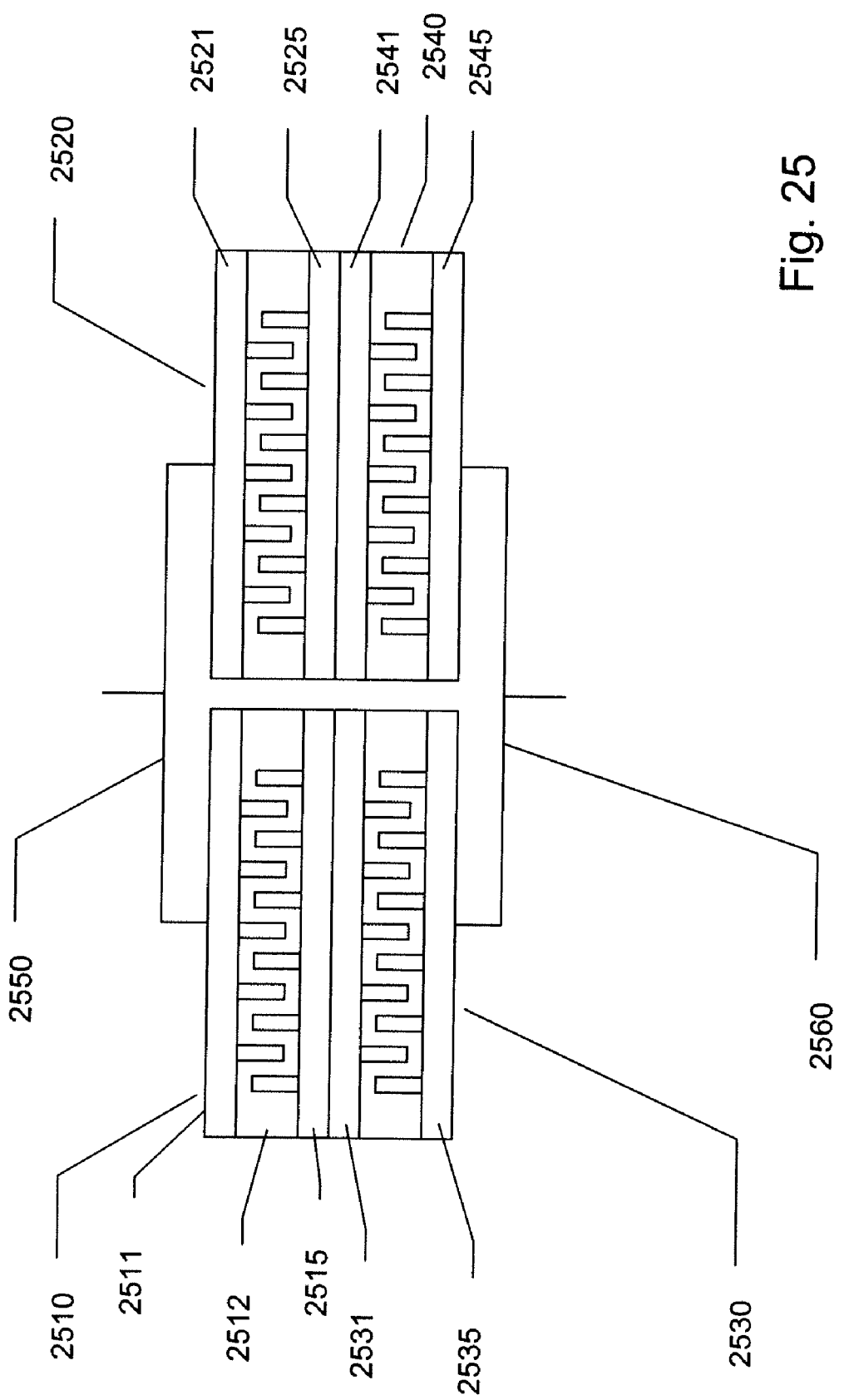
FIG. 25 depicts a vertically integrated charge storage device according to one embodiment of the present invention.

FIG. 25 is a block diagram of an embodiment of the present invention that includes vertical (i.e., serial) and parallel arrangement of electrical storage devices. In this embodiment, IESD 2510 is arranged in series with IESD 2530, IESD 2520 is arranged in series with IESD 2540, and IESDs 2510/2530 are arranged in parallel with IESDs 2520/2540. In this example, the outer electrodes electrically connect together in parallel, plural vertically arranged stacks of storage devices. Thus, outer electrode 2550 is connected to first conductive elements 2510 and 2520, outer electrode 2560 is connected to second conductive elements 2535 and 2545, second conductive element 2515 is connected to first conductive element 2531, and second conductive element 2525 is connected to first conductive element 2541.

Further, vertical integration of electric storage devices according to the present invention does not require that each storage device be completely manufactured prior to integration, and further, the integrated devices may share one or more component. For example, an electrodeposition step for depositing conductive material in pores of a porous material may be performed simultaneously on two sides of a conductive element, thereby effectively forming parts of two vertically integrated devices in a single step. Further, in this example, the two vertically integrated devices share a common conductive element with conductive rods, that extend from top and bottom sides, into different porous membranes.

Figure 26:
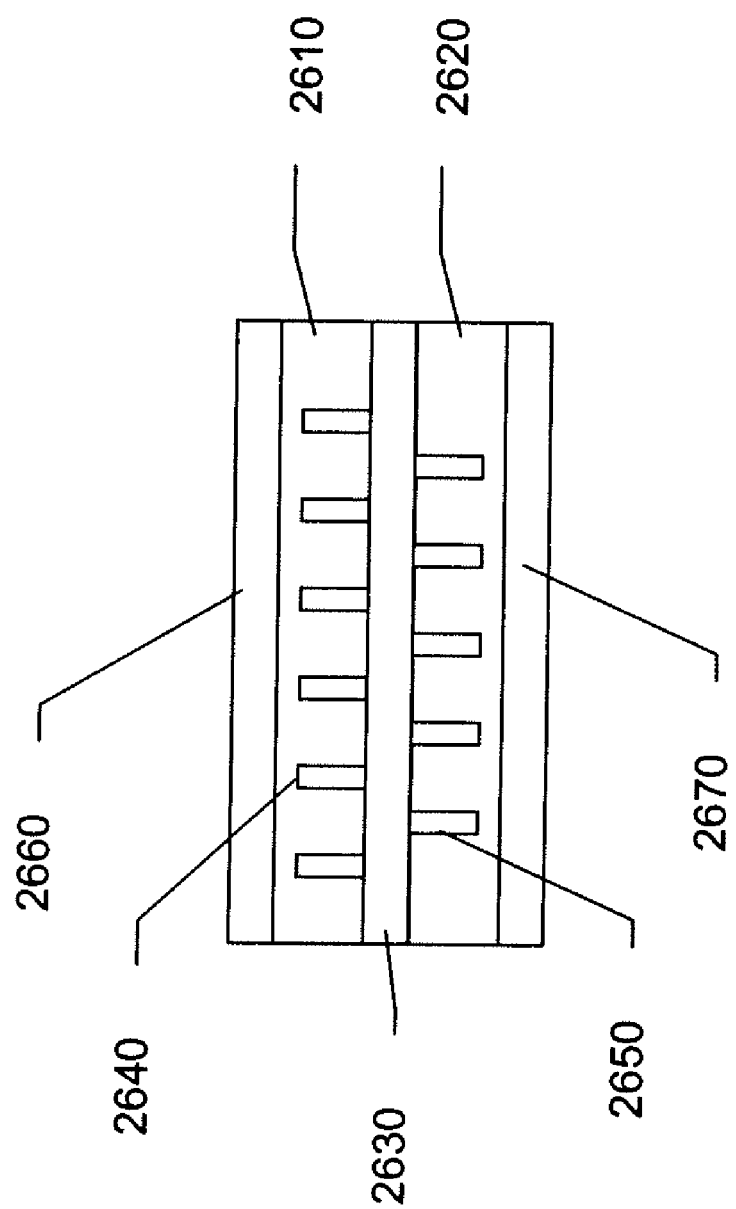
FIG. 26 depicts a vertically integrated charge storage device according to one embodiment of the present invention.

FIG. 26 shows another embodiment of the present invention that includes two vertically arranged integrated devices that share a common conductive element 2630. A first porous membrane 2610 is arranged on one side of the common conductive element 2630 and a second porous membrane 2620 is arranged on another side of the common conductive element 2630. Using this arrangement, metal may be added to pores in both the first porous membrane 2610 and pores in the second porous membrane 2620 to create conductive rods 2640 and 2650, using a single metal adding step, for example an electrodeposition step as described above, including adding the top electrode 2660 and the bottom electrode 2670 after completing the electrodeposition. Further, although the pores of porous membranes 2610 and 2620 are not shown, the pores extend all the way through each of the porous membranes from an opening on one side to an opening on the other side.

Advantages

Unique properties due to nano-scale geometry of structures have been discovered. These properties include 1) an increased role of transition zones near interfaces between different materials due to large increase in interfacial area to volume ratio—this feature increases polarization and effective permittivity yielding unexpected capacitance (modeling/theory of this feature is not yet completed), 2) new material properties, for example, dielectric behavior, due to imposition of novel geometric arrangements in small structures, such as high curvature of bonded neighbors—this feature is another contribution to increased effective permittivity and capacitance (modeling/theory of this feature is not yet completed), and 3) mechanical flexibility of materials (excellent in nano-scale) allowing for high tolerance of bending forces and thermal cycling.

Owing to the flexibility of the processes described above, a wide range of materials: metals, alloys, semiconductors, and polymers allows for optimization of design or development of designs to meet specific performance metrics such as: low cost, high reliability, low volume, low weight, thin structures, high flexibility (for example wearable applications), high energy density per volume or per weight, etc. Applications may specify one or more performance metrics. In case of several performance metrics optimization may require special techniques when compromise between metrics is required because conflicts between metrics may occur. Such techniques are well developed and known under the name "decision making in situations with multiple conflicting criteria". The wide range of available materials allows for selection of materials with minimal thermal mismatch, which is important for reliability in temperature cycling.

Finally, the processes described above are relatively low-cost procedures. Fabrication is based on special deposition processes, including electro-deposition. The processes are well controlled and suitable for precise fabrication of designed and optimized structures. The developed processes are insensitive to common contaminants and thus do not require expensive clean room facilities. Equipment used in fabrication is inexpensive because the processes are based on self assembly and natural phenomena creating nano-structures. Consequently, complex structures can be built at a low cost of production. The fabrication processes are characterized by minimal waste of materials and of particular importance is the fact that toxic waste is orders of magnitude smaller than in typical semiconductor fabrication.

The processes are also characterized by low energy intensity. All the mentioned characteristics indicate that the device fabrication is inexpensive and environmentally friendly. The low environmental impact is due to fabrication with very low toxic wastes and low energy intensity, which translates to low green house effects.

Finally, the processes discussed above permit the vertical integration of structures. Vertical integration yields high surface areas of metal (conductor)/dielectric interfaces. Metals forming vertically integrated capacitors are good thermal conductors and thus increase the effective transverse thermal conductivity of the device. This property lowers the thermal resistance of heat transfer and thus reduces the temperature gradient, which results in lower thermally induced stresses. Further, vertical integration and precise deposition with the efficient use of materials permit optimization of energy density per volume or energy density per weight, which are important performance metrics in many portable applications.

Numerous modifications and variations on the present invention are possible in light of the above teachings. It is, therefore, to be understood that within the scope of the accompanying claims, the invention may be practiced otherwise than as specifically described herein.

The invention claimed is:

1. A capacitive device comprising:
    a first conductive element;
    a second conductive element;
    a porous membrane disposed between the first conductive element and the second conductive element and including pores extending through the porous membrane from a first side of the porous membrane to a second side of the porous membrane;
    a conductive material disposed inside the pores and in contact with the first conductive element; and
    a dielectric material layer other than air and polycarbonate, having a higher dielectric constant than air and polycarbonate, disposed at least in the pores between the conductive material and the second conductive element,
    wherein the porous membrane has a pore density in a range of $10^8$ to $10^{12}$ pores/cm$^2$ and a distance between the conductive material and the second conductive element is 1 µm or less.

2. The device according to claim 1, wherein the dielectric material layer includes at least one of a polyxylene polymer, glass, porcelain, nitrogen, and sulfur hexafluoride.

3. The device according to claim 1, wherein pore diameters ranges from 10 nanometers to 60 nanometers.

4. The device according to claim 1, wherein the porous membrane is one of polycarbonate PC, polyethylene PET, aluminum oxide, barium titanate, titanium oxide, and lead zirconium titanate.

5. The device according to claim 1, wherein the porous membrane has a dielectric constant less than or equal to 10.

6. The device according to claim 1, wherein the porous membrane has a dielectric constant between 10 and 100.

7. The device according to claim 1, wherein the porous membrane has a dielectric constant of 100 or greater.

8. The device according to claim 1, wherein the conductive material comprises at least one of gold, copper, a conductive polymer, or a semiconductor.

9. The device according to claim 1, wherein a length of the conductive material inside the pores ranges from 10 µm to 100 µm.

10. The device according to claim 1, wherein the first conductive element includes a metal layer deposited on the porous membrane.

11. The device according to claim 10, wherein the metal layer includes at least one of silver, nickel print, gold, and copper.

12. The device according to claim 1, wherein the dielectric material layer includes at least one of a polyxylene polymer, nitrogen, and sulfur hexafluoride.

13. A charge supply device comprising:
a porous membrane; and
a first conductive element and a second conductive element disposed on respective sides of the porous membrane, said first and second conductive elements configured to store a charge and to discharge the charge into a load connected between the first conductive element and the second conductive element,
wherein the first and second conductive elements, upon the discharge, produce a time varying current which decreases linearly in time following an initial exponential decrease,
the porous membrane further comprises pores extending through the porous membrane from a first side closest to the first conductive element to a second side closest to the second conductive element,
a conductive material is disposed inside the pores, in contact with the first conductive element, and configured to store at least a portion of said charge inside the pores, and
a dielectric material layer other than air and polycarbonate, having a higher dielectric constant than air and polycarbonate, is disposed at least in the pores between the conductive material and the second conductive element,
wherein the porous membrane has a pore density in a range of $10^8$ to $10^{12}$ pores/cm$^2$ and a distance between the conductive material and the second conductive element is 1 μm or less.

14. The device according to claim 13, wherein said first conductive element, said second conductive element, and said porous membrane are configured to provide a capacitance density within a range of 1 mF/cm$^3$ to 100 F/cm$^3$.

15. An interdigitated energy storage device comprising:
a first conductive element and a second conductive element;
a membrane including a first side arranged in contact with the first conductive element and a second side arranged in contact with the second conductive element, the membrane including plural first pores and plural second pores that each extend completely from the first side to the second side;
a plurality of first conductive rods electrically connected to the first element and extending into the first pores without electrically contacting the second element, wherein a pore opening is between each of the first conductive rods and the second element; and
a plurality of second conductive rods electrically connected to the second element and extending into the second pores without electrically contacting the first element, wherein a pore opening is between each of the second conductive rods and the first element.

16. The device according to claim 15, wherein:
the first conductive element and the second conductive element are configured to supply a time varying discharge current into a load connected between the first conductive element and the second conductive element, and
the time varying discharge current decreases linearly after decreasing exponentially.

17. The device according to claim 15, wherein said first conductive element and said second conductive element have a capacitance density within a range of 1 mF/cm$^3$ to 100 F/cm$^3$.

18. The device according to claim 15, wherein a dielectric material layer other than air and polycarbonate, having a higher dielectric constant than air and polycarbonate, is disposed in each pore opening.

19. A vertically integrated charge storage device, comprising:
a conductive element;
a first porous membrane disposed on a first side of the conductive element and including first pores extending through the first porous membrane;
a second porous membrane disposed on a second side of the conductive element and including second pores extending through the second porous membrane;
a conductive material disposed inside the first pores and the second pores and in direct contact with the conductive element;
a first electrode disposed on the first porous membrane over the first pores on a side of the first porous membrane opposite the conductive element and
a second electrode disposed on the second porous membrane over the second pores on a side of the second porous membrane opposite the conductive element,
wherein the conductive material disposed inside the first pores is not in direct contact with the first electrode and the conductive material disposed inside of the second pores is not in direct contact with the second electrode.

20. The device according to claim 19, wherein a dielectric material layer other than air and polycarbonate, having a higher dielectric constant than air and polycarbonate, is disposed between the conductive material inside the first pores the first electrode and between the conductive material inside of the second pores and the second electrode.

21. A vertically integrated charge storage device, comprising:
at least two capacitors, each including
a first conductive element;
a second conductive element;
a porous membrane disposed between the first conductive element and the second conductive element and including pores extending through the porous membrane from a first side of the porous membrane to a second side of the porous membrane;
a conductive material disposed inside the pores and in contact with the first conductive element; and
a dielectric material layer other than air and polycarbonate, having a higher dielectric constant than air and polycarbonate, is disposed at least in the pores between the conductive material and the second conductive element,
wherein the porous membrane has a pore density in a range of $10^8$ to $10^{12}$ pores/cm$^2$ and a distance between the conductive material and the second conductive element is 1 μm or less,
said at least two capacitors arranged adjacent to one another, one of the first conductive element and the second conductive element of each of the at least two capacitors is connected to a respective second conductive element or first conductive element of an adjacent one of the at least two capacitors.

22. The device of claim 21, further comprising an electrode connecting together two of the at least two capacitors.

* * * * *

UNITED STATES PATENT AND TRADEMARK OFFICE
CERTIFICATE OF CORRECTION

PATENT NO. : 8,385,046 B2
APPLICATION NO. : 11/934031
DATED : February 26, 2013
INVENTOR(S) : Olgierd A. Palusinski et al.

It is certified that error appears in the above-identified patent and that said Letters Patent is hereby corrected as shown below:

On the title page, Item (73), the 1st Assignee's information is incorrect, Item (73) should read:

--(73) Assignees: The Arizona Board Regents on behalf of the University of Arizona, Tucson, AZ (US); The Regents of the University of California, Oakland, CA (US)--

Signed and Sealed this
Fourteenth Day of May, 2013

Teresa Stanek Rea
*Acting Director of the United States Patent and Trademark Office*